(12) United States Patent
Chiera et al.

(10) Patent No.: US 9,765,682 B2
(45) Date of Patent: Sep. 19, 2017

(54) MULTI-CHAMBER IGNITER

(71) Applicant: Woodward, Inc., Ft. Collins, CO (US)

(72) Inventors: Domenico Chiera, Fort Collins, CO (US); Gregory James Hampson, Boulder, CO (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 14/458,947

(22) Filed: Aug. 13, 2014

(65) Prior Publication Data

US 2015/0040845 A1    Feb. 12, 2015

Related U.S. Application Data

(63) Continuation-in-part of application No. 13/913,840, filed on Jun. 10, 2013, now Pat. No. 8,839,762.

(51) Int. Cl.
| | |
|---|---|
| *F01P 3/16* | (2006.01) |
| *F02P 13/00* | (2006.01) |
| *F02B 19/10* | (2006.01) |
| *F02B 19/12* | (2006.01) |
| *F02B 19/18* | (2006.01) |
| *H01T 13/54* | (2006.01) |
| *F02P 9/00* | (2006.01) |

(52) U.S. Cl.
CPC .............. *F01P 3/16* (2013.01); *F02B 19/108* (2013.01); *F02B 19/1095* (2013.01); *F02B 19/12* (2013.01); *F02B 19/18* (2013.01); *F02P 13/00* (2013.01); *H01T 13/54* (2013.01); *F02P 9/007* (2013.01); *Y02T 10/125* (2013.01)

(58) Field of Classification Search
CPC ........ Y02T 10/125; F02B 19/12; F02B 19/08; F02B 19/108; H01T 13/54
USPC ........ 123/143 R, 169 R, 253, 254, 256, 260, 123/262, 263, 266, 267, 286; 313/143
See application file for complete search history.

(56) References Cited

U.S. PATENT DOCUMENTS

| | | | |
|---|---|---|---|
| 892,296 | A | 6/1908 | Oberhansli |
| 1,009,867 | A | 11/1911 | Terry |
| 1,242,375 | A | 10/1917 | Robinson |
| 1,253,570 | A | 1/1918 | Berry |
| 1,320,115 | A | 10/1919 | Bloomhuff et al. |

(Continued)

FOREIGN PATENT DOCUMENTS

| | | |
|---|---|---|
| AT | 410007 | 1/2003 |
| AT | 509876 | 12/2011 |

(Continued)

OTHER PUBLICATIONS

Authorized Officer Martinez Cebollada, PCT International Search Report and Written Opinion of the International Searching Authority, PCT/US2014/041758, dated Sep. 10, 2014, 11 pages.

(Continued)

*Primary Examiner* — Sizo Vilakazi
(74) *Attorney, Agent, or Firm* — Fish & Richardson P.C.

(57) ABSTRACT

Air/fuel mixture is received from a combustion chamber of the internal combustion engine into an enclosure about a flame kernel initiation gap between a first ignition body and a second ignition body. Air/fuel mixture received into the enclosure is directed into a flame kernel initiation gap. The mixture is then ignited in the flame kernel initiation gap.

20 Claims, 16 Drawing Sheets

(56) References Cited

U.S. PATENT DOCUMENTS

| | | |
|---|---|---|
| 1,322,493 A | 11/1919 | Little |
| 1,325,439 A | 12/1919 | Dinger |
| 1,360,294 A | 11/1920 | Hill |
| 1,361,347 A | 12/1920 | Nighswander |
| 1,361,580 A | 12/1920 | Herz |
| 1,538,750 A | 5/1925 | Scognamillo |
| 1,594,773 A | 8/1926 | French |
| 1,596,240 A | 8/1926 | Dikeman |
| 1,611,856 A | 12/1926 | Farnsworth |
| 1,700,603 A | 1/1929 | Vreeland et al. |
| 1,732,827 A | 10/1929 | Adam |
| 1,748,338 A | 2/1930 | Georgias |
| 1,963,801 A | 6/1934 | O'Marra |
| 2,047,575 A | 7/1936 | Burtnett |
| 2,127,513 A | 8/1938 | Harper, Jr. |
| 2,153,598 A | 4/1939 | Steward |
| 2,208,030 A | 7/1940 | Holmes |
| 2,231,173 A | 2/1941 | Starr |
| 2,299,924 A | 10/1942 | Ost |
| 2,314,128 A | 3/1943 | Coldwell |
| 2,416,107 A | 2/1947 | Litton |
| 2,456,080 A | 12/1948 | Pe |
| 2,487,535 A | 11/1949 | Fernandez |
| 2,497,862 A | 2/1950 | Chuy |
| 2,509,538 A | 5/1950 | Sues |
| 2,586,864 A | 2/1952 | Rose |
| 2,614,546 A | 10/1952 | Schwarz |
| 2,673,554 A | 3/1954 | Thaheld |
| 2,758,576 A | 8/1956 | Schlamann |
| 2,776,394 A | 1/1957 | Cuny et al. |
| 2,843,780 A | 7/1958 | Harper, Jr. |
| 2,895,069 A | 7/1959 | Davis |
| 2,899,585 A | 8/1959 | Dollenberg |
| 2,957,099 A | 10/1960 | Dutterer |
| 3,230,939 A | 1/1966 | Abramovich |
| 3,270,722 A | 9/1966 | Springer |
| 3,300,672 A | 1/1967 | Fisher |
| 3,665,902 A | 5/1972 | Bloomfield |
| 3,710,764 A | 1/1973 | Jozlin |
| 3,718,425 A | 2/1973 | Weyl et al. |
| 3,911,874 A | 10/1975 | Vincent |
| 3,911,878 A | 10/1975 | Hofbauer et al. |
| 3,958,144 A | 5/1976 | Franks |
| 4,004,413 A | 1/1977 | Ueno |
| 4,091,772 A | 5/1978 | Heater |
| 4,092,558 A | 5/1978 | Yamada |
| 4,098,232 A | 7/1978 | Gleiter |
| 4,123,998 A | 11/1978 | Heintzelman |
| 4,124,000 A | 11/1978 | Genslak |
| 4,125,094 A | 11/1978 | Noguchi et al. |
| 4,218,993 A | 8/1980 | Blackburn |
| 4,232,638 A | 11/1980 | Takahashi |
| 4,248,189 A | 2/1981 | Barber et al. |
| 4,248,192 A | 2/1981 | Lampard |
| 4,372,264 A | 2/1983 | Trucco |
| 4,398,513 A | 8/1983 | Tanasawa |
| 4,406,260 A | 9/1983 | Burley |
| 4,416,228 A | 11/1983 | Benedikt et al. |
| 4,424,780 A | 1/1984 | Trucco |
| 4,429,669 A | 2/1984 | Burley |
| 4,441,469 A | 4/1984 | Wilke |
| 4,452,189 A | 6/1984 | Latsch et al. |
| 4,490,122 A | 12/1984 | Tromeur |
| 4,509,476 A | 4/1985 | Breuser et al. |
| 4,532,899 A | 8/1985 | Lorts |
| 4,641,616 A | 2/1987 | Lampard |
| 4,646,695 A | 3/1987 | Blackburn |
| 4,744,341 A | 5/1988 | Hareyama et al. |
| 4,765,293 A | 8/1988 | Gonzalez |
| 4,795,937 A | 1/1989 | Wagner et al. |
| 4,854,281 A | 8/1989 | Hareyama et al. |
| 4,901,688 A | 2/1990 | Kashiwara et al. |
| 4,930,473 A | 6/1990 | Dietrich |
| 4,963,784 A | 10/1990 | Niessner |
| 4,987,868 A | 1/1991 | Richardson |
| 5,014,656 A | 5/1991 | Leptich et al. |
| 5,051,651 A | 9/1991 | Kashiwara et al. |
| 5,067,458 A | 11/1991 | Bailey |
| 5,076,229 A | 12/1991 | Stanley |
| 5,091,672 A | 2/1992 | Below |
| 5,105,780 A | 4/1992 | Richardson |
| 5,107,168 A | 4/1992 | Friedrich et al. |
| 5,222,993 A | 6/1993 | Crane |
| 5,224,450 A | 7/1993 | Paul et al. |
| 5,239,959 A | 8/1993 | Loth et al. |
| 5,245,963 A | 9/1993 | Sabol et al. |
| 5,271,365 A | 12/1993 | Oppenheim |
| 5,369,328 A | 11/1994 | Gruber et al. |
| 5,408,961 A | 4/1995 | Smith |
| 5,421,300 A | 6/1995 | Durling et al. |
| 5,430,346 A | 7/1995 | Johnson |
| 5,454,356 A | 10/1995 | Kawamura |
| 5,554,908 A | 9/1996 | Kuhnert et al. |
| 5,555,862 A | 9/1996 | Tozzi |
| 5,555,867 A | 9/1996 | Freen |
| 5,555,868 A | 9/1996 | Neumann |
| 5,560,326 A | 10/1996 | Merritt |
| 5,612,586 A | 3/1997 | Benedikt et al. |
| 5,619,959 A | 4/1997 | Tozzi |
| 5,623,179 A | 4/1997 | Buhl |
| 5,632,253 A | 5/1997 | Paul et al. |
| 5,647,444 A | 7/1997 | Williams |
| 5,662,181 A | 9/1997 | Williams et al. |
| 5,678,517 A | 10/1997 | Chen et al. |
| 5,715,788 A | 2/1998 | Tarr |
| 5,791,374 A | 8/1998 | Black et al. |
| 5,799,637 A | 9/1998 | Cifuni |
| 5,803,026 A | 9/1998 | Merritt |
| 5,821,675 A | 10/1998 | Suzuki |
| 5,829,407 A | 11/1998 | Watson |
| 5,892,319 A | 4/1999 | Rossi |
| 5,947,076 A * | 9/1999 | Srinivasan ............... F02B 19/12 |
| | | 123/256 |
| 6,013,973 A | 1/2000 | Sato |
| 6,060,822 A | 5/2000 | Krupa et al. |
| 6,064,144 A | 5/2000 | Knoll et al. |
| 6,095,111 A | 8/2000 | Ueda |
| 6,129,069 A | 10/2000 | Uitenbroek |
| 6,129,152 A | 10/2000 | Hosie et al. |
| 6,130,498 A | 10/2000 | Shimizu et al. |
| 6,198,209 B1 | 3/2001 | Baldwin et al. |
| 6,279,550 B1 | 8/2001 | Bryant |
| 6,302,067 B1 | 10/2001 | Merritt |
| 6,305,346 B1 | 10/2001 | Ueda et al. |
| 6,318,335 B2 | 11/2001 | Tomczyk |
| 6,326,719 B1 | 12/2001 | Boehler et al. |
| 6,340,013 B1 | 1/2002 | Britton |
| 6,460,506 B1 * | 10/2002 | Nevinger ................ H01T 13/54 |
| | | 123/260 |
| 6,495,948 B1 | 12/2002 | Garret, III |
| 6,554,016 B2 | 4/2003 | Kinder |
| 6,574,961 B2 | 6/2003 | Shiraishi |
| 6,595,182 B2 | 7/2003 | Oprea |
| 6,611,083 B2 | 8/2003 | LaBarge et al. |
| 6,670,740 B2 | 12/2003 | Landon, Jr. |
| 6,749,172 B2 | 6/2004 | Kinder |
| 6,830,017 B2 | 12/2004 | Wolf et al. |
| 6,913,092 B2 | 7/2005 | Bourgoyne et al. |
| 7,004,444 B2 | 2/2006 | Kinder |
| 7,007,661 B2 | 3/2006 | Warlick |
| 7,007,913 B2 | 3/2006 | Kinder |
| 7,025,036 B2 | 4/2006 | Lampard |
| 7,086,376 B2 | 8/2006 | McKay |
| 7,100,567 B1 | 9/2006 | Bailey et al. |
| 7,104,245 B2 | 9/2006 | Robinet et al. |
| 7,367,307 B2 | 5/2008 | Lampard |
| 7,370,626 B2 | 5/2008 | Schubert |
| 7,408,293 B2 | 8/2008 | Francesconi et al. |
| 7,409,933 B2 | 8/2008 | Nino |
| 7,438,043 B2 | 10/2008 | Shiraishi |
| 7,615,914 B2 | 11/2009 | Francesconi et al. |
| 7,628,130 B2 | 12/2009 | Johng |
| 7,659,655 B2 | 2/2010 | Tozzi et al. |
| 7,762,320 B2 | 7/2010 | Williams |

(56) References Cited

U.S. PATENT DOCUMENTS

| | | |
|---|---|---|
| 7,848,871 B2 | 12/2010 | Onishi |
| 7,856,956 B2 | 12/2010 | Inoue et al. |
| 7,891,426 B2 | 2/2011 | Williams |
| 7,922,551 B2 | 4/2011 | Tozzi |
| 7,950,364 B2 | 5/2011 | Nerheim |
| 8,033,335 B2 | 10/2011 | Orbell et al. |
| 8,143,772 B2 | 3/2012 | Francesconi |
| 8,181,617 B2 * | 5/2012 | Kuhnert ............... F02P 23/04 123/143 B |
| 8,261,711 B2 | 9/2012 | Shimoda |
| 8,286,734 B2 | 10/2012 | Hannegan et al. |
| 8,313,324 B2 | 11/2012 | Bulat et al. |
| 8,322,432 B2 | 12/2012 | Bailey et al. |
| 8,353,337 B2 | 1/2013 | Bailey et al. |
| 8,387,587 B2 | 3/2013 | Ogata |
| 8,499,854 B2 | 8/2013 | Mitchell et al. |
| 8,584,648 B2 | 11/2013 | Chiera et al. |
| 8,733,331 B2 | 5/2014 | McAlister |
| 8,757,129 B1 | 6/2014 | Hill |
| 8,800,536 B2 | 8/2014 | Plata |
| 8,857,405 B2 * | 10/2014 | Attard ............... F02B 19/12 123/261 |
| 8,890,396 B2 | 11/2014 | Ernst et al. |
| 8,924,136 B2 | 12/2014 | Nakamoto |
| 8,925,518 B1 | 1/2015 | Riley |
| 9,172,216 B2 | 10/2015 | Ernst |
| 2004/0061421 A1 | 4/2004 | Morita et al. |
| 2004/0100179 A1 | 5/2004 | Boley et al. |
| 2004/0123849 A1 | 7/2004 | Bryant |
| 2005/0000484 A1 | 1/2005 | Schultz et al. |
| 2005/0092285 A1 | 5/2005 | Klonis et al. |
| 2005/0211217 A1 | 9/2005 | Boley et al. |
| 2005/0279321 A1 | 12/2005 | Crawford |
| 2006/0005803 A1 | 1/2006 | Robinet et al. |
| 2006/0278195 A1 | 12/2006 | Hotta |
| 2007/0069617 A1 | 3/2007 | Tozzi et al. |
| 2007/0151540 A1 | 7/2007 | Takahashi et al. |
| 2007/0169737 A1 | 7/2007 | Gong et al. |
| 2007/0236122 A1 | 10/2007 | Borror |
| 2007/0261672 A1 | 11/2007 | Lippert |
| 2008/0017165 A1 | 1/2008 | Schubert |
| 2008/0168963 A1 | 7/2008 | Gagliano |
| 2008/0257301 A1 | 10/2008 | Hotta |
| 2009/0236144 A1 | 9/2009 | Todd et al. |
| 2009/0241896 A1 | 10/2009 | Fiveland |
| 2009/0309475 A1 | 12/2009 | Tozzi |
| 2010/0132660 A1 | 6/2010 | Nerheim |
| 2010/0133977 A1 | 6/2010 | Kato |
| 2010/0147259 A1 | 6/2010 | Kuhnert et al. |
| 2011/0036638 A1 | 2/2011 | Sokol et al. |
| 2011/0062850 A1 | 3/2011 | Tozzi |
| 2011/0065350 A1 | 3/2011 | Burke |
| 2011/0089803 A1 | 4/2011 | Francesconi |
| 2011/0148274 A1 | 6/2011 | Ernst |
| 2011/0297121 A1 | 12/2011 | Kraus et al. |
| 2011/0308489 A1 | 12/2011 | Herden |
| 2011/0320108 A1 | 12/2011 | Morinaga |
| 2012/0000664 A1 | 1/2012 | Nas et al. |
| 2012/0013133 A1 | 1/2012 | Rios, III et al. |
| 2012/0064465 A1 | 3/2012 | Borissov et al. |
| 2012/0103302 A1 | 5/2012 | Attard |
| 2012/0118262 A1 | 5/2012 | Johnson |
| 2012/0125279 A1 | 5/2012 | Hampson et al. |
| 2012/0125287 A1 * | 5/2012 | Chiera ............... F02B 19/12 123/254 |
| 2012/0125636 A1 | 5/2012 | Linde et al. |
| 2012/0299459 A1 | 11/2012 | Sakakura |
| 2012/0310510 A1 | 12/2012 | Imamura |
| 2013/0000598 A1 | 1/2013 | Tokuoka |
| 2013/0042834 A9 | 2/2013 | Chiera et al. |
| 2013/0047954 A1 | 2/2013 | McAlister |
| 2013/0055986 A1 | 3/2013 | Tozzi et al. |
| 2013/0099653 A1 | 4/2013 | Ernst |
| 2013/0139784 A1 * | 6/2013 | Pierz ............... F02B 19/12 123/254 |
| 2013/0160734 A1 | 6/2013 | Redtenbacher et al. |
| 2013/0179050 A1 | 7/2013 | Munshi |
| 2013/0192896 A1 | 8/2013 | Bailey et al. |
| 2013/0206122 A1 | 8/2013 | Chiera et al. |
| 2013/0220269 A1 | 8/2013 | Woo et al. |
| 2014/0076274 A1 | 3/2014 | Tozzi et al. |
| 2014/0083391 A1 | 3/2014 | Gruber |
| 2014/0102404 A1 | 4/2014 | Sotiropoulou et al. |
| 2014/0137840 A1 | 5/2014 | McAlister |
| 2014/0144406 A1 | 5/2014 | Schock |
| 2014/0165980 A1 | 6/2014 | Chiera et al. |
| 2014/0190437 A1 | 7/2014 | Chiera et al. |
| 2014/0209057 A1 | 7/2014 | Pouring |
| 2014/0261294 A1 | 9/2014 | Thomassin |
| 2015/0020769 A1 | 1/2015 | Huang |
| 2015/0040845 A1 | 2/2015 | Chiera et al. |
| 2015/0068489 A1 | 3/2015 | Bunce |
| 2015/0075506 A1 | 3/2015 | Ishida |
| 2015/0128898 A1 | 5/2015 | Osaka |
| 2015/0260131 A1 | 9/2015 | Riley |
| 2015/0267631 A1 | 9/2015 | Miyamoto |
| 2015/0354481 A1 | 12/2015 | Geckler |
| 2016/0010538 A1 | 1/2016 | Suzuki |
| 2016/0017845 A1 | 1/2016 | Huang |
| 2016/0024994 A1 | 1/2016 | Engineer |
| 2016/0047323 A1 | 2/2016 | Suzuki |
| 2016/0053668 A1 | 2/2016 | Loetz |

FOREIGN PATENT DOCUMENTS

| | | |
|---|---|---|
| CA | 1010329 | 5/1977 |
| CA | 2320415 | 3/2001 |
| CN | 2825995 | 10/2006 |
| DE | 31 20 007 | 12/1982 |
| DE | 3230793 | 2/1984 |
| DE | 3913665 | 10/1990 |
| DE | 4422939 | 1/1996 |
| DE | 19624965 | 1/1998 |
| DE | 10143209 | 6/2002 |
| DE | 101 44 976 | 4/2003 |
| DE | 102010004851 | 6/2011 |
| DE | 102011006597 A1 | 3/2012 |
| DE | 102012021842 B4 | 9/2014 |
| EP | 0 675 272 | 10/1995 |
| EP | 0971107 | 1/2000 |
| EP | 1026800 A2 | 8/2000 |
| EP | 1028506 A1 | 8/2000 |
| EP | 0937196 | 9/2000 |
| EP | 1265329 | 12/2002 |
| EP | 1556592 | 10/2003 |
| EP | 1556932 | 7/2005 |
| EP | 1701419 | 9/2006 |
| FI | 121759 | 3/2011 |
| FI | 122501 | 2/2012 |
| FR | 577766 A | 9/1924 |
| FR | 764079 A | 5/1934 |
| FR | 985788 A | 7/1951 |
| FR | 2071129 A5 | 9/1971 |
| FR | 2131938 A2 | 11/1972 |
| FR | 2131938 B2 | 8/1979 |
| FR | 2846042 | 4/2004 |
| GB | 588074 | 5/1947 |
| JP | 50077738 | 6/1975 |
| JP | S5252013 | 4/1977 |
| JP | 57-018283 | 1/1982 |
| JP | 58162719 | 9/1983 |
| JP | H02148588 | 12/1990 |
| JP | 03-011575 | 1/1992 |
| JP | 4133281 | 5/1992 |
| JP | 4262388 | 9/1992 |
| JP | 08-260970 | 10/1996 |
| JP | 09166024 | 6/1997 |
| JP | 2008-504649 | 2/2006 |
| RU | 2116474 | 7/1998 |
| SU | 968493 | 10/1982 |
| SU | 1370269 | 1/1988 |
| WO | WO 87/07777 | 12/1987 |
| WO | WO 91/06142 | 5/1991 |
| WO | WO 92/02718 | 2/1992 |

(56) References Cited

FOREIGN PATENT DOCUMENTS

| WO | WO 2004/036013 | 4/2004 |
|----|----|----|
| WO | WO 2004/036709 | 4/2004 |
| WO | WO 2004/107518 | 12/2004 |
| WO | WO 2006/011950 | 2/2006 |
| WO | WO 2009/060119 A1 | 5/2009 |
| WO | WO 2009/109694 A2 | 9/2009 |
| WO | WO 2009/130376 A1 | 10/2009 |
| WO | WO 2010/072519 | 7/2010 |
| WO | WO 2011/031136 | 3/2011 |
| WO | WO2011085853 | 7/2011 |
| WO | WO 2011/101541 | 8/2011 |
| WO | WO 2011/128190 | 10/2011 |
| WO | WO 2011/151035 | 12/2011 |
| WO | WO 2012/021914 A1 | 2/2012 |
| WO | WO2012/091739 | 7/2012 |
| WO | WO2014/201030 | 12/2014 |

OTHER PUBLICATIONS

PCT International Search Report and Written Opinion of the International Searching Authority, PCT/US2015/045113, dated Nov. 27, 2015, 11 pages.
Office Action issued in Japanese Application No. 2015-523312 dated Sep. 13, 2016; 3 pages.
Bosch, Spark Plugs Technical Information, published on or before Nov. 28, 2014, 28 pages.
Chiera et al., "Cap Shielded Ignition System", U.S. Appl. No. 14/664,431, Mar. 20, 2015, 22 pages.
Office Action issued in Japanese Application No. 2015-523312 dated Mar. 1, 2016; 5 pages.
Communication Pursuant to Article 94(3) EPC, European Application No. 14734707.4, May 6, 2016, 5 pages.
Chiera et al., "Quiescent Chamber Hot Gas Igniter", U.S. Appl. No. 13/913,840, filed Jan. 8, 2013, 33 pages.
Fino Scholl et al., "Development and Analysis of a Controlled Hot Surface Ignition System for Lean Burn Gas Engines" Proceedings of the ASME 2012 Internal Combustion Engine Division Spring Technical Conference ICES2012, May 6-9, 2012 (12 pages).
Sachin Joshi et al., "On Comparative Performance Testing of Prechamber and Open Chamber Laser Ignition" Journal of Engineering for Gas Turbines and Power, Dec. 2011, vol. 133, pp. 122801-1 to 122801-5.
McIntyre, Dustin L., et al., "Lean-Burn Stationary Natural Gas Reciprocating Engine Operation with a Prototype Miniature Diode Side Pumped Passively Q-Switched Laser Spark Plug" U.S. Department of Energy, National Energy Technology Laboratory, 2008, 14 pages.
Dale, J.D. et al., "Enhanced Ignition for I. C. Engines With Premixed Charge," Lawrence Berkeley Laboratory, Society of Automotive Engineers Annual Congress, Oct. 1980, 52 pages.
"New Spark Plug Concepts for Modern-Day Gasoline Engines," Beru Aktiengesellschaft, MTZ vol. 68, Feb. 2007, 8 pages.
BorgWarner BERU Systems Pre-Chamber Technology, 1 page, published at least as early as Jun. 9, 2013.
BorgWarner BERU Systems, BERU Industrial Spark Plugs, Feb. 2012, 48 pages.
Maria-Emmanuella McCoole, M.Sc.E.E. et al.; Solutions for Improving Spark Plug Life in High Efficiency, High Power Density, Natural Gas Engines; Proceedings of ICES2006; ASME Internal Combustion Engine Division 2006 Spring Technical Conference; May 8-10, 2006, Aachen, Germany; ICES2006-1417; pp. 1-8.
Dr. Luigi Tozzi et al.; Advanced Combustion System Solutions for Increasing Thermal Efficiency in Natural Gas Engines While Meeting Future Demand for Low NOx Emissions; Proceedings of JRCICE2007; 2007 ASME/IEEE Joint Rail Conference & Internal Combustion Engine Spring Technical Conference; Mar. 13-16, 2006, Pueblo, Colorado USA; JRCICE2007-40026; pp. 1-7.
Jessica Adair et al; Knock Characterization Using Ionization Detection; GMRC Gas Machinery Conference; Oklahoma City, Oklahoma; Oct. 2006; pp. 1-23.
Hironori Osamura, Development of Long Life and High Ignitability iridium Spark Plug, Technical Paper, Seoul 2000 FISITA World Automotive Congress; Jun. 12-15, 2000 Seoul, Korea; 6 pages.
Hironori Osamura, Development of New Iridium Alloy for Spark Plug Electrodes; SAE Technical Paper Series; 1999-01-0796; SI Engine Components and Technology (SP-1437); International Congress and Exposition Mar. 1-4, 1999; 14 pages.
"Wartsila 34SG Engine Technology for Compressor Drive," Wartsila Engines, Wartsila Corporation 2009, 16 pages.
Federal Mogul, Champion® Bridge Iridium Spark Plug, Industrial Gas Stationary Engines—High Demand/Premium Market, Jun. 2012, 1 page.

* cited by examiner

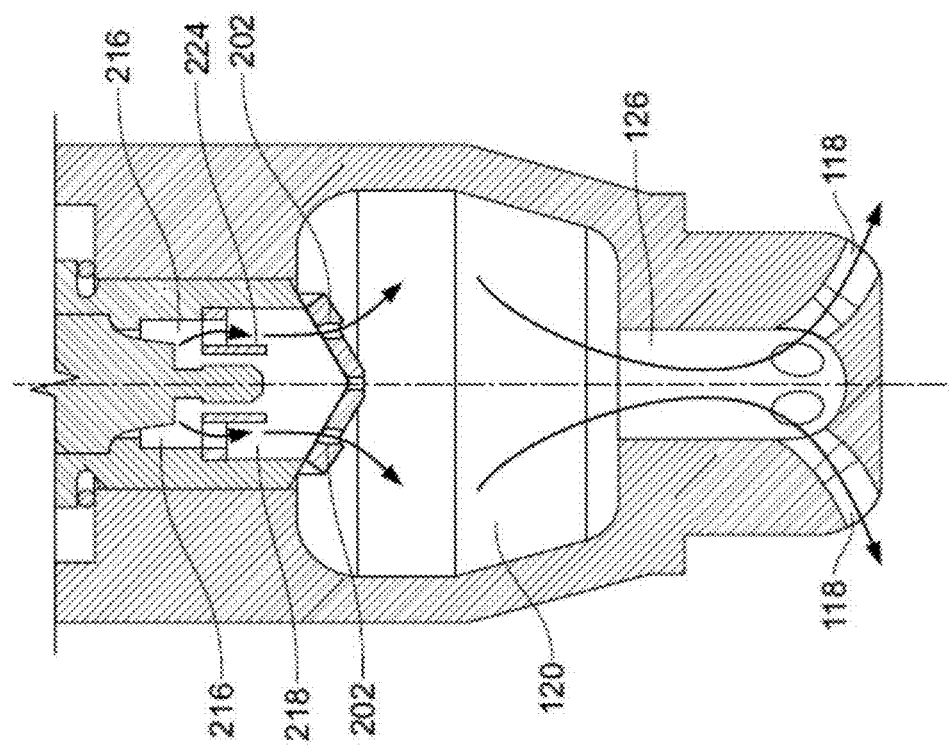
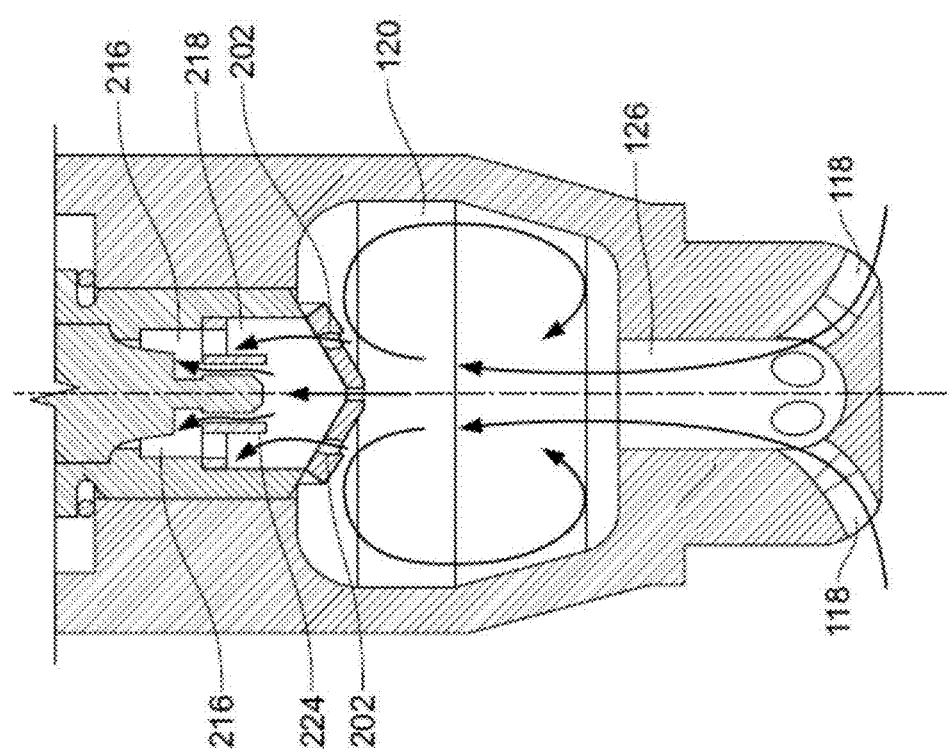

MULTI-CHAMBER IGNITER

CLAIM OF PRIORITY

This application is a continuation-in part of and claims priority to U.S. patent application Ser. No. 13/913,840 filed on Jun. 10, 2013 and entitled "Multi-Chamber Igniter." The entire contents of which are hereby incorporated by reference.

BACKGROUND

Engines operating on gaseous fuels, such as natural gas, are commonly supplied with a lean fuel mixture, which is a mixture of air and fuel containing excess air beyond that which is stoichiometric for combustion. In some engines, multiple chambers within the igniter plug can allow more efficient combustion of lean fuel mixtures. However, residual heat within chambers near the igniter can cause pre-ignition events, thus limiting combustion efficiency. Furthermore, residual heat within other chambers can improve combustion efficiency. Thus, effective management of heat conduction within a multi-chamber igniter plug can improve combustion efficiency.

BRIEF DESCRIPTION OF THE DRAWINGS

FIGS. 3A and 3B are half side cross-sectional views of a portion of the example prechamber ignition plug and antechamber showing flow into and out of the prechamber and antechamber before and after ignition;

FIG. 4B shows no end cap, FIG. 4E shows the ignition bodies of the igniter extended into the antechamber.

Like reference symbols in the various drawings indicate like elements.

DETAILED DESCRIPTION

The concepts herein relate to igniting an air/fuel mixture in a combustion chamber of an engine using an antechamber.

Figure 1:
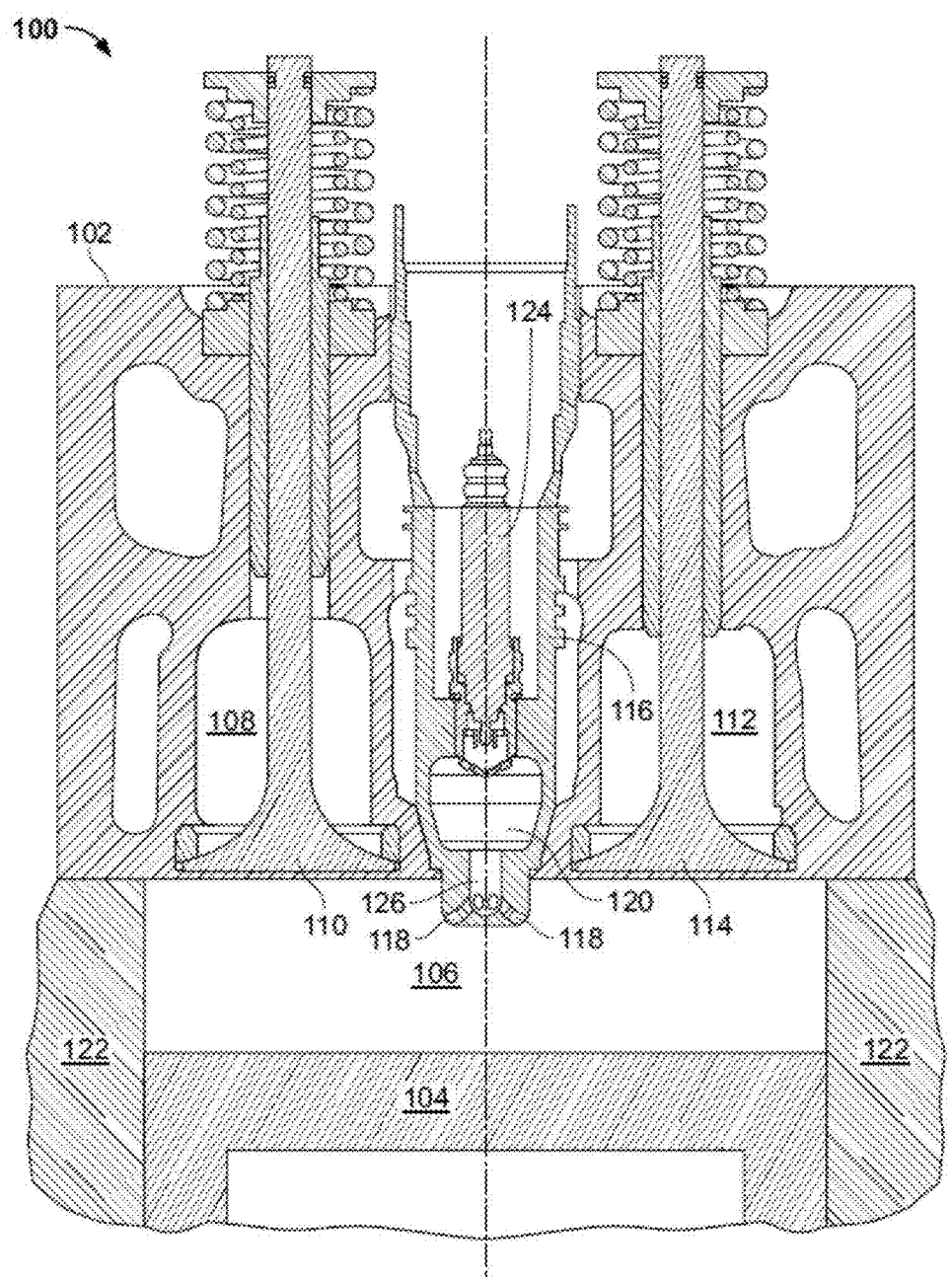
FIG. 1 is a side cross-sectional view of a portion of an internal combustion engine including a prechamber ignition plug in an antechamber.

FIG. 1 shows a cross-section of a portion of an example internal combustion engine 100. The example internal combustion engine 100 is a reciprocating engine and includes a head 102, a block 122, and a piston 104. The piston 104 is located inside a cylinder inside the block 122. The piston 104 is able to reciprocate inside the cylinder during engine operation. The combustion chamber 106 is a volume located inside the cylinder between the head 102 and the piston 104, and is bounded by the block 122.

The example internal combustion engine 100 includes an intake passage 108 with intake valve 110 and an exhaust passage 112 with exhaust valve 114. The passages 108, 112 are in the head 102 adjacent to the combustion chamber 106, and the valves 110, 114 form part of the walls of the combustion chamber 106. During engine operation, the intake valve 110 opens to let a fresh charge of air/fuel mixture flow from the intake passage 108 into the combustion chamber 106. In other instances, the intake valve 110 admits only air and an in-combustion chamber fuel injector admits fuel to form the air/fuel mixture in the combustion chamber 106. After combustion, the exhaust valve 114 opens to exhaust combustion residuals out of the combustion chamber 106 and into the exhaust passage 112. Although the concepts herein are described herein with respect to a reciprocating internal combustion engine, the concepts could be applied to other internal combustion engine configurations.

The example internal combustion engine 100 includes an example tubular receiver housing 116 housing and an igniter plug 124. The tubular receiver housing 116 is located in the head 102 and is threadingly and/or otherwise coupled to the head 102. In some instances, the tubular receiver housing 116 can extend into the combustion chamber 106, be flush with a wall of combustion chamber 106, or be recessed from a wall of combustion chamber 106. The example igniter plug 124 is received inside the example tubular receiver housing 116 and is coupled to the housing threadingly and/or otherwise. The tubular receiver housing 116 thus defines an outer enclosure around the igniter plug 124.

The antechamber 120 is an outer chamber inside the tubular receiver housing 116 adjacent to but separate from the combustion chamber 106. In some instances, the antechamber 120 can be formed in the head 102 itself and the tubular receiver housing 116 can be omitted. The antechamber 120 is also adjacent to but separate from the interior of the igniter plug 124. In other instances, rather than being in a separate housing, the antechamber 120 can be integrated with the igniter plug 124 (e.g., in a common or conjoined housing or enclosure). The antechamber 120 is shown having a symmetrical shape about the centerline of the tubular receiver housing 116 and igniter plug 124, but in other instances it could be an asymmetrical shape. The antechamber 120 is shown having a largest transverse interior dimension (e.g., diameter) that is larger than the largest transverse interior dimension of igniter plug 124 and shell. The antechamber 120 also has larger interior volume than the fluid containing volume of the plug 124. In certain instances, the antechamber 120 can be 10, 20 or even 30 times the volume of the fluid containing volume of the plug 124.

The example tubular receiver housing 116 includes diverging side passages 118. The side passages 118 include external ends which terminate at the exterior of the tubular receiver housing 116 and are nominally located inside the combustion chamber 106. The internal ends of the side passages 118 converge to a central passage 126 that opens into the antechamber 120. The side passages 118 can number one or more and can be located on the tubular receiver housing 116 in a symmetric or asymmetric pattern, diverging from the central passage 126. The side passages 118 allow charge, flame, and residuals to flow between the antechamber 120 and the combustion chamber 106. As discussed in more detail below, after the air/fuel mixture in the antechamber 120 is ignited, the side passages 118 and central passage 126 operate as jet passages to nozzle combusting air/fuel mixture from the antechamber 120 into divergent flame jets that reach deep into the combustion chamber 106 and ignite the charge in the combustion chamber 106. The side passages 118 and central passage 126 also nozzle fresh air/fuel mixture from the combustion chamber 106 into the plug 124. The central passage 126 nozzles the flow into a consolidated flow along the center of the antechamber 120 directed primarily toward the igniter plug 124.

The igniter plug 124 is a device configured to initiate a flame kernel to ignite the charge in the combustion chamber, such as a spark plug, hot surface igniter, laser igniter, and/or other type of igniter. The plug 124 of FIG. 1 is a "prechamber" type plug in that it includes an enclosure that defines an inner chamber enclosing the location of flame kernel initiation. This enclosure is, itself, enclosed within the antechamber 120, and thus an inner enclosure. The igniter plug 124, however, can be other configurations, including an open ended plug. Also, the spark surface may be recessed within the igniter plug cavity with or without a flow restricting end cap or be extended into the antechamber 120.

Figure 2:
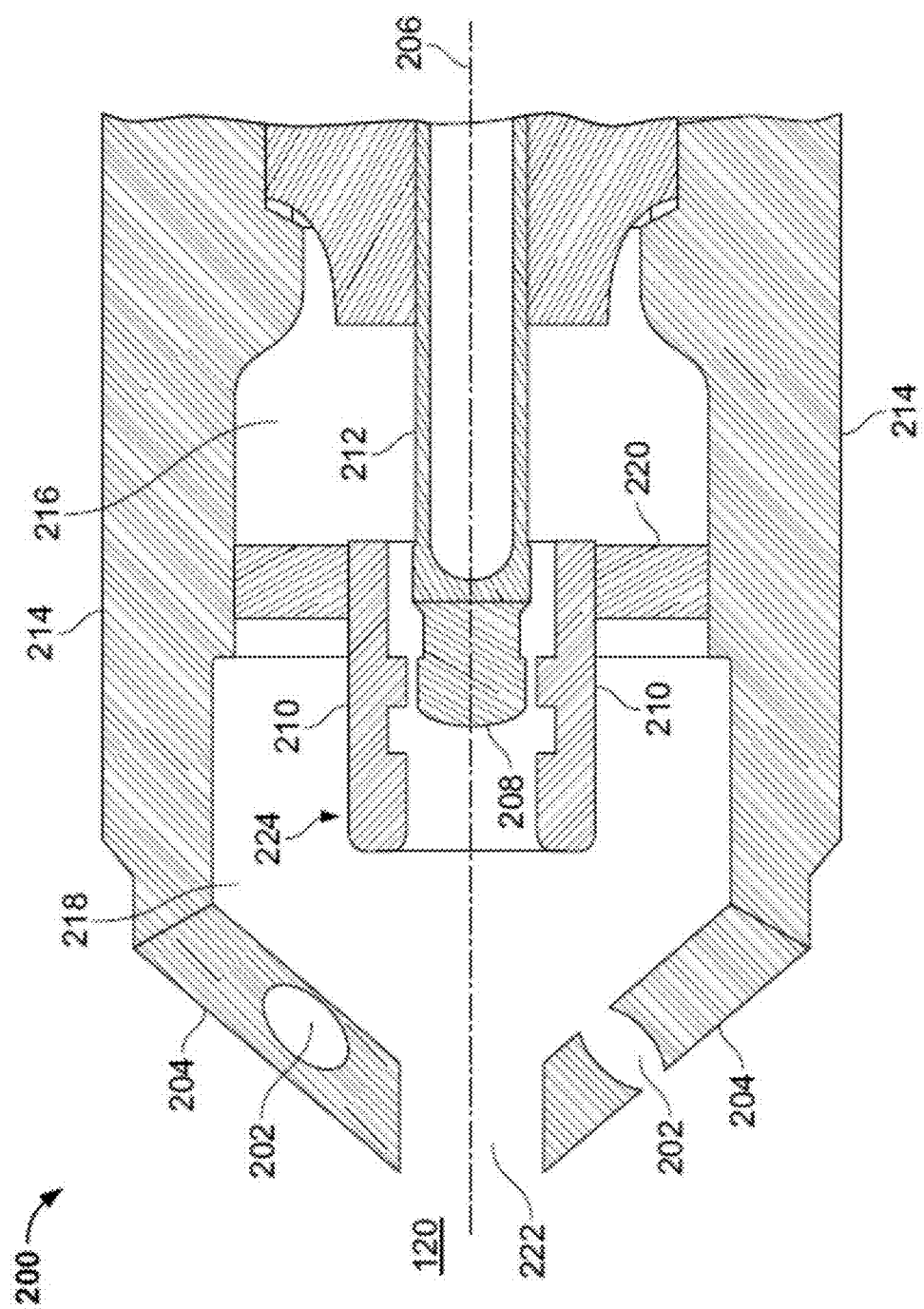
FIG. 2 is a half side cross-sectional view of a portion of an example prechamber spark plug.

FIG. 2 illustrates a cross-sectional view of an example igniter plug 200 that can be used as plug 124. Other configurations of igniter plugs can be used.

The example igniter plug 200 is elongate and centered around a longitudinal central axis 206. In the example igniter plug 200, the central ignition body 208 extends along the longitudinal axis 206 and further extends from a plug body or base 212. In the example igniter plug 200, the second ignition body 210 is tubular and is disposed inside a shell 214. In instances where the igniter plug is a spark plug, the base 212 is an insulator and the center ignition body 208 and the second ignition body 210 are two electrodes that form a spark gap (i.e., an ignition gap where ignition initiates) at the narrowest point between the bodies. In instances where the igniter plug is a heated surface igniter, one or both of the center ignition body 208 and the second ignition body 210 are heated surfaces for initiating a flame kernel in the gap between the bodies.

The tubular ignition body 210 surrounds the center ignition body 208 and has a tubular portion that extends axially forward beyond the end of center ignition body 208. This tubular portion forms a velocity control tube 224. The velocity control tube 224 is a tubular structure that, in FIG. 2, is shown extending beyond the end of the center ignition body 208. The velocity control tube 224 is configured to collect and direct flow into a flame kernel initiation gap (e.g., spark gap) between the center ignition body 208 and the tubular ignition body 210. The velocity control tube 224 and tubular ignition body 210 can be cylindrical, polygonal, or some other shape. The center ignition body 208 similarly has a cylindrical shape, a polygonal shape, or some other shape. The ignition bodies can also have a variable shape along their axial length. The tubular ignition body 210 and center ignition body 208 may or may not be the same or corresponding shape. Also, although the velocity control tube 224 and tubular ignition body 210 are both shown as being continuous without breaks, they need not be without breaks. In certain instances, the tubular ignition body 210 can be formed of multiple ground electrodes that converge around the center ignition body 208 but do not contact and form a generally tubular shape. Other arrangements of ignition bodies (i.e., other than a tubular ignition body surrounding a central ignition body) are within the concepts herein, including a standard J-Gap plug having a J-shaped ignition body. Also, the ignition body (whether tubular, J-shaped or otherwise) can be provided with or without the velocity control tube 224.

The plug 200 includes a shell 214 that is a portion of the enclosure. The shell 214 defines a prechamber of the plug 200 that is a fluid containing volume containing a forward zone 218 in front of the flame kernel initiation gap and a back zone 216 behind the flame kernel initiation gap. The shell 214 is attached to the base 212 and holds an end cap 204, or a nozzle, but, as described below, may also function without an end cap 204. An end cap 204 constitutes another portion of the enclosure and a front end of the forward zone 218 of the igniter plug 200. In certain instances, the end cap 204 can be integrated into the shell 214 (formed as a single piece), as opposed to being a separate piece attached to the shell 214 as is shown. The shell 214 and end cap 204 define a male conical shape that protrudes into the antechamber 120 to facilitate recirculation within the antechamber 120 (discussed below). In other instances, the end cap 204 can be flat, have a domed shape, or have another shape. The end cap 204 has a center opening 222 and a plurality of peripheral openings 202. The center opening 222 is configured to direct flow incoming into the forward zone 218 primarily towards and into the interior of the velocity control tube 224 and into the flame kernel initiation gap. The peripheral openings 202 are peripheral jet passages configured to direct flow incoming into the prechamber primarily to an exterior of the tubular ignition body 210 and to swirl around the prechamber. Thus, in certain instances, the center opening 222 is axially oriented and aligned with the longitudinal axis 206, and the peripheral openings are neither parallel nor perpendicular to the longitudinal axis 206. Each of the peripheral openings 202 can be the same size (i.e., have the same cross-sectional flow area) or they can be different sizes. The center opening 222 can, likewise, be the same size as the peripheral openings 202 or of a different size. As discussed in more detail below, after the charge in the prechamber is ignited, the openings 202, 222 operate as jet passages that nozzle combusting air/fuel mixture from the prechamber into flame jets that reach deep into the antechamber 120 and ignite the charge in the antechamber 120. Prior to ignition, the openings 202, 222 operate as jet passages that nozzle fresh air/fuel mixture from the antechamber 120 into jets into the prechamber.

The tubular ignition body 210 is shown supported from a disc portion 220 mounted to the interior sidewall of the shell 214. In other instances, the tubular ignition body 210 can be supported from one or more legs that extend from a rearward end of the prechamber. Other configurations are within the concepts herein.

FIG. 3A and FIG. 3B show a portion of the example igniter plug 200 and example antechamber 120. FIG. 3A shows arrows indicating flow into the antechamber 120 and igniter plug 200 prior to ignition of the air/fuel mixture. FIG. 3B shows arrows indicating flow out of the igniter plug 200 and the antechamber 120 after ignition of the air/fuel mixture has begun.

In operation of the engine, the compressive action of the piston 104 forces a portion of the cool (relative to residual combustion gasses), fresh air/fuel mixture to flow from the combustion chamber 106 into the antechamber 120 through the side passages 118 and central passage 126 (FIG. 3A). The central passage 126 operates as a nozzle, and in some instances a converging nozzle, to direct the flow into the antechamber. Thus, for example, the central passage 126 has cross-sectional flow area equal to or less than the combined flow area of side passages 118. The central passage 126 nozzles the incoming cool, fresh charge into a central high-velocity flow primarily directed to impinge on the end cap 204 and into the center opening 222 and peripheral openings 202 of the plug 200. The central flow has a higher velocity than flow elsewhere in the antechamber 120, and tends to displace residual combustion gasses away from the front of the igniter plug 200 and its openings 202, 222 to feed the cool, fresh air/fuel mixture into the forward zone 218 and into the flame initiation gap. A portion of the fresh air/fuel mixture entering the antechamber 120 does not enter the prechamber, but rather circulates within the antechamber 120 trapping the residuals displaced from in front of the igniter plug 200 into a recirculation loop away from the end of igniter plug 200 (FIG. 3A).

The interior walls of the antechamber 120 are configured to direct the portion of the incoming flow into a toroidal vortex within the antechamber 120. The upper end of the antechamber 120 adjacent the entrance of the plug 200 has a wall that transitions in a smooth curve to the sidewalls of the antechamber 120. Flow from the central passage 126 impinging on or stagnating on the igniter plug 200 that is not received into the igniter body 128 is deflected laterally by the conical end of the igniter plug 200 and guided to circulate in a toroidal vortex by the upper end wall and the smooth curve to the sidewalls around the outer perimeter of the antechamber 120. The conical end of the igniter plug 200 and smooth curve to the sidewalls can be configured to reduce flow separation and other disturbances to the flow in creating this toroidal vortex. In certain instances, the upper end wall is orthogonal to the central axis of the plug 200 and antechamber 120 to guide the flow around to the outer perimeter of the sidewalls, but it could be another shape. The sidewalls transition in a smooth curve to the lower end of the antechamber 120. The lower end wall guides the circulating flow into the flow from the central passage 126 in a manner that encourages the circulating flow to turn and flow back upward. For example, the walls guide the circulating flow to re-enter the flow from the passage 126 orthogonally (precisely and/or substantially) to the primary direction of flow or generally in the primary direction of the flow from the passage 126 (i.e., not counter to the primary direction of flow). Recombining the flow in this manner does not substantially counter the incoming flow, and thus substantially maintains the flow velocity from the central passage 126 to the igniter plug 200 that sweeps residuals in front of the plug 200 and feeds the igniter plug 200 with cool, fresh air/fuel mixture. In certain instances, the lower end wall is orthogonal to the central axis and directs the circulating flow orthogonally (precisely or substantially) into the flow from the central passage 126. In other instances, the wall can have a non-zero angle (and introduce the flow at a non-zero angle) to the central axis and primary direction of flow from the central passage 126. The resulting circulation creates a toroidal vortex of flow in the antechamber 120 that provides a controlled degree of turbulence within the antechamber 120. Also, as the central flow and the vortex flow meet, the mixing of the flows creates turbulence. Finally, the toroidal vortex confines residual combustion gasses within the circulation in the antechamber 120, away from the igniter plug 200.

The igniter plug 200 can have a depression (i.e., a bowl) located on the end. Prior to ignition, the depression collects the impinging central flow at exterior the end cap 204 by partially blocking lateral flow off the igniter plug 200 and creates a higher pressure in this region. Coupled with the high velocity of the central flow, this higher pressure tends to drive the central flow into the igniter forward zone 218 and creates a higher pressure within the prechamber than generally in the antechamber 120. (It should be noted that the pressure within prechamber is still less than that of the combustion chamber 106.) The air/fuel mixture impinging on the plug 200 flows into the igniter forward zone 218 through the center opening 222 and through the plurality of openings 202. The center opening 222 directs the air/fuel mixture primarily to the interior of the velocity control tube 224 that, in turn, directs the flow into the flame kernel initiation gap between center ignition body 208 and tubular ignition body 210. The velocity control tube 224 collects the flow from the center opening 222 (by blocking lateral flow off the center ignition body 208) and causes the flow in the interior of the tube 224 to stagnate and create a higher pressure than the pressure around the exterior of the tube 224 and the pressure at the exit of the tubular ignition body 210. The velocity of the flow from the center opening 222 together with the pressure differential creates backward preferential velocity flow, guided by the velocity control tube 224 and tubular ignition body 210, through the flame initiation gap towards the back chamber 216 (FIG. 3A). This flow through the flame initiation gap forces the last combustion event residuals backwards and out of the flame initiation gap region, effectively purging the flame initiation gap of residuals and providing the flame initiation gap with a healthy supply of fresh air/fuel mixture. Purging the residuals backwards (away from the end cap) out of the flame initiation gap, in certain instances, can lead to exceptionally low coefficient of variation (COV).

The air/fuel mixture in the flame initiation gap is ignited in the flame kernel initiation gap (e.g. by a spark arcing between the central ignition body 208 and the tubular ignition body 210, by the heated surfaces of the central ignition body 208 and/or the tubular ignition body 210, and/or in another manner). The velocity of the air/fuel mixture in the gap causes the initial flame kernel to be transported into the back zone 216. Removal of the flame kernel from the flame initiation gap and into the back zone can, in certain instances, reduce the temperature of the flame initiation surfaces of the ignition bodies both because the kernel is moved away from the flame initiation surfaces quickly and because the flow from the central opening 222 is a constant source of cool (cooler than combustion products) air/fuel mixture. Reducing the temperature of the flame initiation surfaces reduces a primary factor in flame initiation plug loss of life: high temperature oxidation of the flame initiation surface in the presence of high temperature oxidizing environment. Removal of the flame kernel from the flame initiation gap also reduces the quenching effect of the ignition bodies 208, 210 on the growing flame kernel, thus, promoting a stronger kernel and healthier combustion event.

The peripheral openings 202 are oriented to introduce a swirling motion to the incoming air/fuel mixture and direct flow primarily exterior of the tubular ignition body 210 and velocity control tube 224. Therefore, the swirling air/fuel mixture flows past the outside of the velocity control tube 224 and tubular ignition body 210 toward the back chamber 216 where it is ignited by the flame kernel. The velocity control tube 224 and tubular ignition bodies 210 act to shield and protect the flow in the flame initiation gap from flow disturbances due to the swirling motion of the surrounding outside flow until the kernel is established and exits from the rear of the tubular ignition body 210. The turbulence caused by the swirling motion of the air/fuel mixture distributes the growing flame kernel around the back chamber 216 predominantly consuming the air/fuel mixture in the back chamber 216 before consuming the air/fuel mixture in the igniter forward zone 218. This results in a rapid increase in pressure inside the igniter forward zone 218 as combustion of the air/fuel mixture proceeds from the back chamber 216 to the forward zone 218. In certain instances, the mean maximum pressure rise from combustion of the air/fuel mixture inside the igniter forward zone 218 is greater than 15 bar and, in certain instances, greater than 20 bar or 30 bar over the mean maximum pressure of the combustion chamber prior to ignition. Such pressures can be achieved without fuel feed or fuel enrichment into the igniter prechamber or antechamber 120. The increased pressure created in the prechamber by the combustion causes the combusting air/fuel mixture to jet out the openings 202, 222 as a flame and into the antechamber 120 (FIG. 3B). During combustion of the air/fuel mixture in the forward zone 218, the enclosure protects the growing flame from turbulence (and relatively less quiescent flow patterns) in the antechamber 120 and in the combustion chamber 106.

The antechamber 120 provides a large, volume in which the flow can be controlled so as to protect the flame source and where the flame can grow protected from turbulence in the combustion chamber 106. Once the flames have been jetted into the antechamber 120, the vortex flow and turbulence inside the antechamber 120 promotes combustion, distributing the growing flame around the antechamber 120. The increased pressure generated by the growing flame in antechamber 120 forces the flame to jet out the side passages 118 into the combustion chamber 106. Larger flame jets generated by the flame inside antechamber 120 cause faster and more complete combustion of the air/fuel mixture inside the combustion chamber 106 than would jets from the igniter openings 202, 222.

Although shown as a passively fueled antechamber 120, where the combustible fuel enters only via the side passages 118, in other instances, the antechamber 120 can include active injection of fuel via a delivery tube into the antechamber 120 to enrich the mixture or into the prechamber spark plug volume as well. In many instances, however, the turbulence generation in the antechamber is sufficient to generate fast enough turbulence enhanced combustion that fuel feed or fuel enrichment are not necessary to achieve rapid combustion and high pressure rise in the antechamber.

Notably, ignition can be delayed by the flow of the flame kernel to the back chamber 216 and the flow of the flame back through the igniter forward zone 218 and antechamber 120 and into the combustion chamber 106. Because this increased ignition delay time results in a more complete burn, the process is more repeatable and has less variation, and therefore a lower COV. An additional benefit of the delay in ignition is that the flame initiation can be initiated sooner in the combustion cycle when the cylinder pressure is lower than would be the case without the ignition delay. Initiating the flame initiation when the cylinder pressure is lower prolongs the life of the flame initiation surfaces of the igniter plug 200. A lower cylinder pressure requires less voltage to initiate a flame initiation, and a lower power causes less erosion of the spark surfaces. In some implementations, the flame initiation can be initiated 10-12 degrees of crank angle earlier than a traditional flame initiation plug.

FIGS. 4A-4G are cross-sectional views of several other example igniter plugs that can be used as igniter plug 124 and several other example antechambers. Except as described below, the additional example igniter plugs and antechambers of FIGS. 4A-4G are substantially similar to and operate similarly to the examples shown in FIGS. 1-3.

Figure 4A:
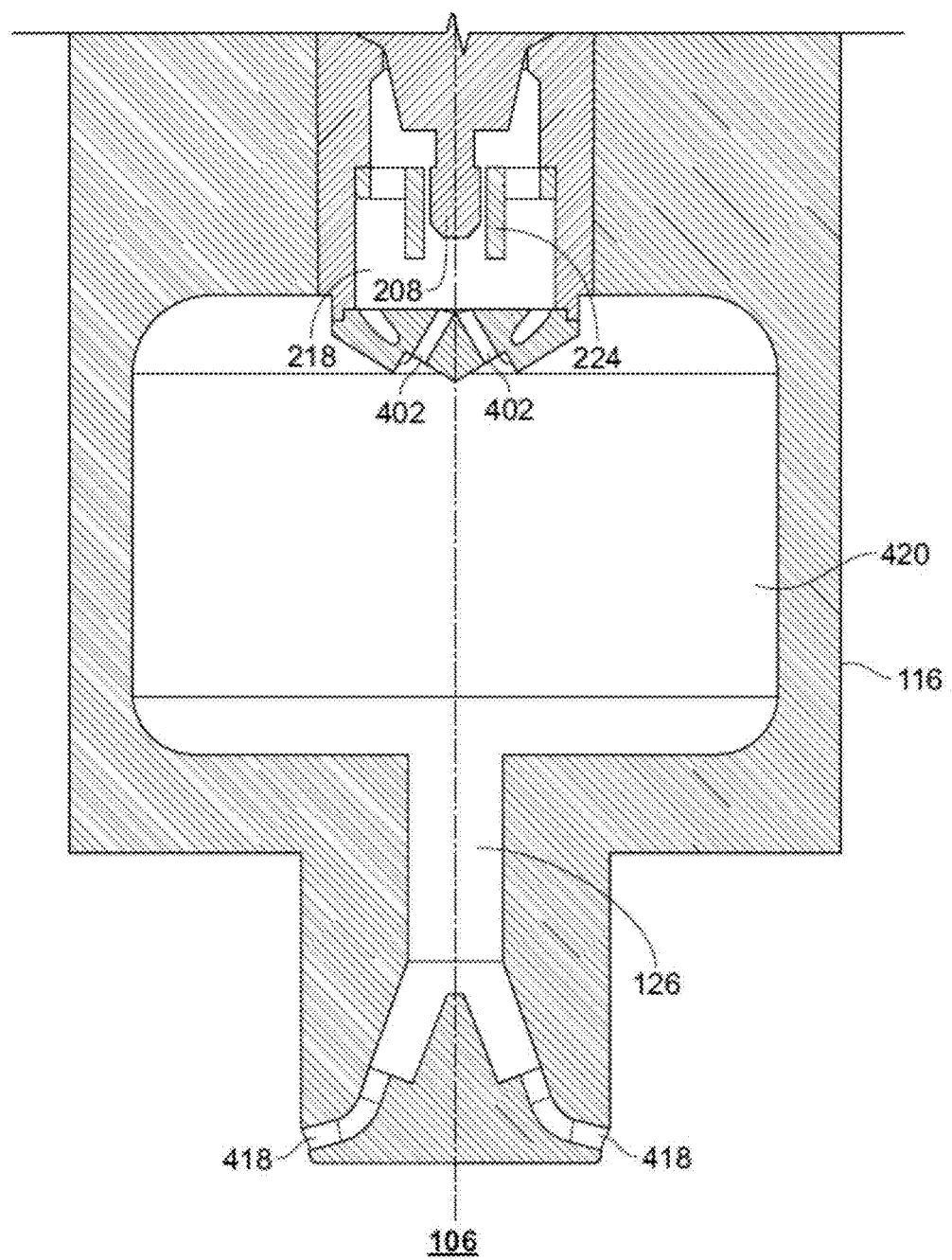
FIGS. 4A-G are half side cross-sectional views of other examples of igniter plugs and antechambers, where

The example igniter plugs each have a slightly different configuration at their end. FIG. 4A has an end cap with a plurality of converging openings 402 that converge to the centerline of the igniter plug. After ignition, the openings 402 operate as jet passages to nozzle combusting air/fuel mixture from the prechamber into divergent flame jets that reach deep into the antechamber 420 and ignite the charge in the antechamber 420. Prior to ignition, the openings 402 converge flow of cool, fresh air/fuel mixture into a jet of flow primarily oriented into the tubular body 224. The exterior openings of the openings 402 are within the bowl on the end of the igniter plug to facilitate entry of the fresh air/fuel mixture into the igniter forward zone 218. Peripheral openings may be included or omitted.

Figure 4B:
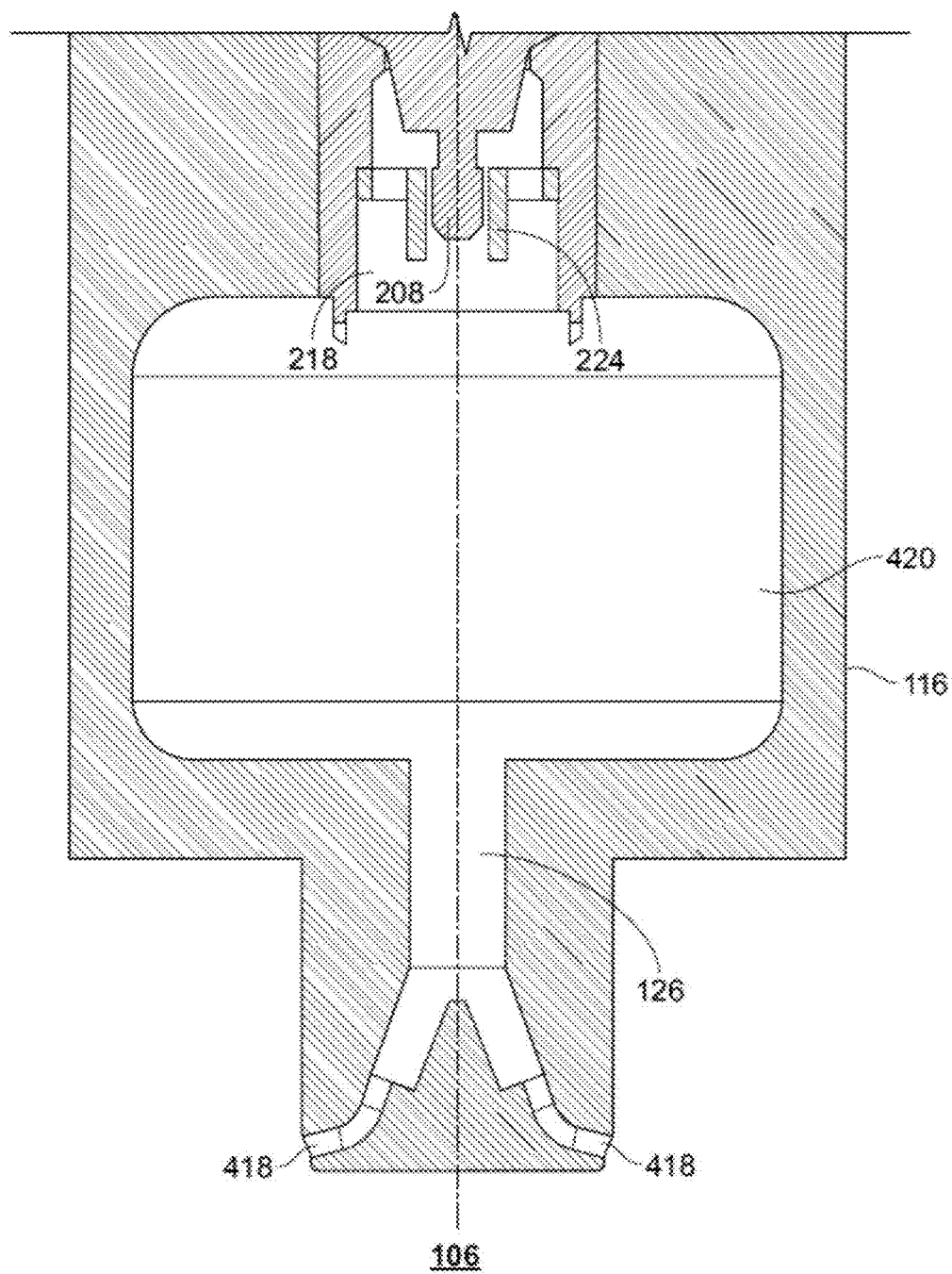

FIG. 4B is an igniter plug that has no end cap, rather it has an open end. The shell 214 defines a cavity in the interior of the ignition plug, but the cavity is not enclosed. The open end presents no substantial flow restriction against cool, fresh air/fuel mixture flowing directly into the forward zone 218 and tubular body 224 prior to ignition. The incoming fresh charge increases the pressure in forward and back zones 218, 216 until a sufficiently high pressure rejects the incoming flow, redirecting a portion laterally to generate the toroidal vortex in the antechamber 420 described above. In certain instances (of this configuration or other configurations described herein), radial spokes holding the tubular body 224 and tubular ignition body 210 around the central ignition body 208 can be canted or angled to induce swirl within the back chamber 216. The swirl provides a specified degree of turbulence that facilitates rapid and complete combustion of the air/fuel mixture within the igniter plug that, in turn, ignites the charge in the antechamber 420.

Figure 4C:
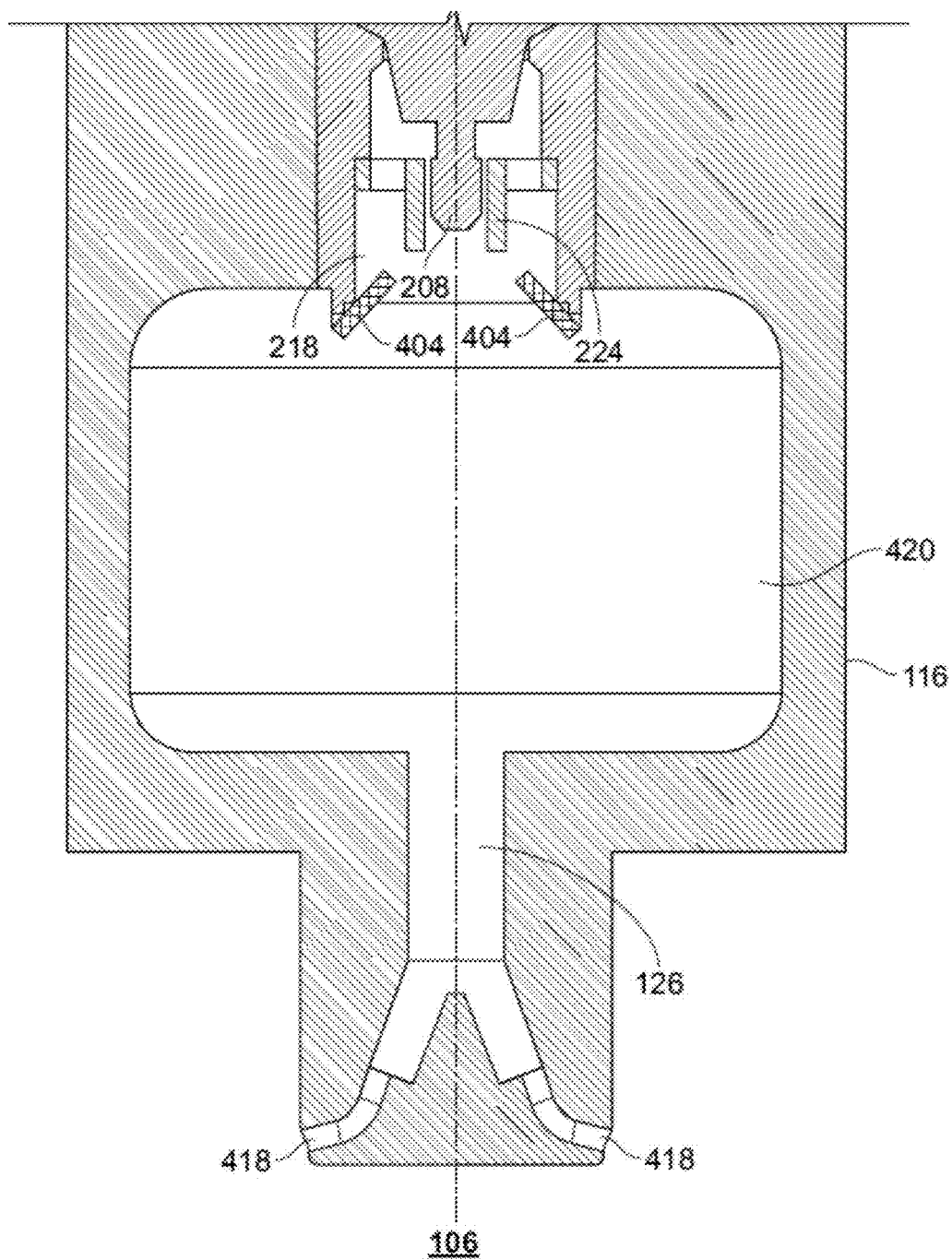
Figure 4D:
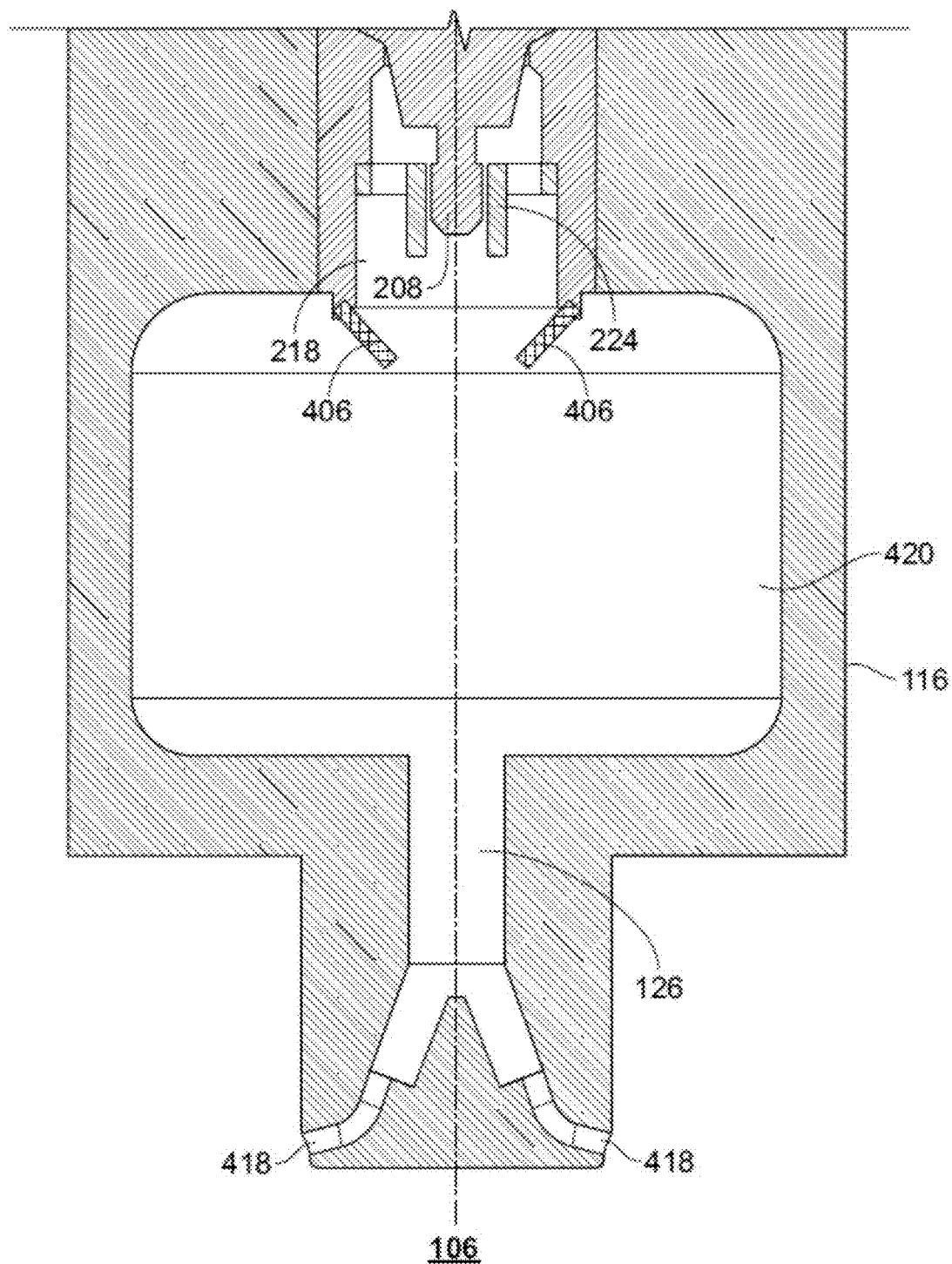

FIG. 4C is an igniter plug that has an end cap 404 that presents a female, converging cone to the flow incoming from the central passage 126 of the antechamber. The conic end cap 404 defines a single central opening, and may be provided with or without peripheral openings. Prior to ignition, the conic end cap 404 is a jet passage that converges and nozzles cool, fresh air/fuel mixture into the prechamber, with a substantial portion of the air/fuel mixture being primarily directed into the tubular body 224. The conic end cap 404 also directs a portion of the incoming fresh charge laterally to recirculate within the antechamber 420. After ignition, the central opening is a jet passage that jets the flame present in the prechamber deeply into the antechamber 420 to ignite the air/fuel mixture in the antechamber 420. In other instances, as in FIG. 4D, the end cap 406 can present a male, diverging cone to the flow incoming from the central passage 126 of the antechamber 420.

Figure 4E:
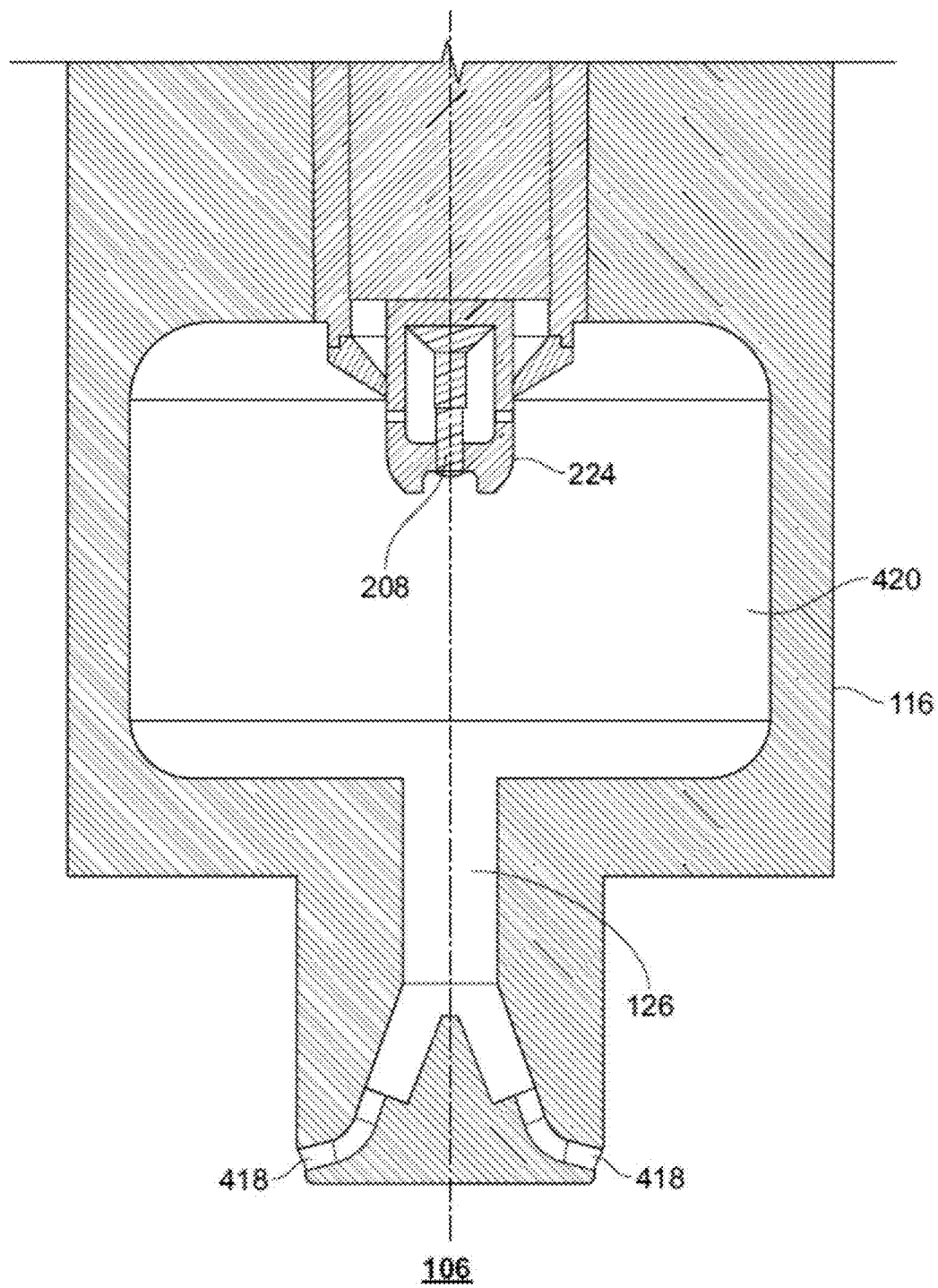

FIG. 4E is an igniter plug has the ignition bodies 208, 210 extending into the antechamber 420. The tubular body 224 directs a portion of the incoming fresh charge from the central passage of the antechamber 420, outside of the tubular body 224 and laterally to recirculate and generate the toroidal vortex in the antechamber 420. The tubular ignition body 210 can extend back to the base 212 and have lateral holes to eject residuals (before ignition) and the flame kernel (after ignition) or can have one or more spaced apart legs extending back to the base.

Figure 4F:
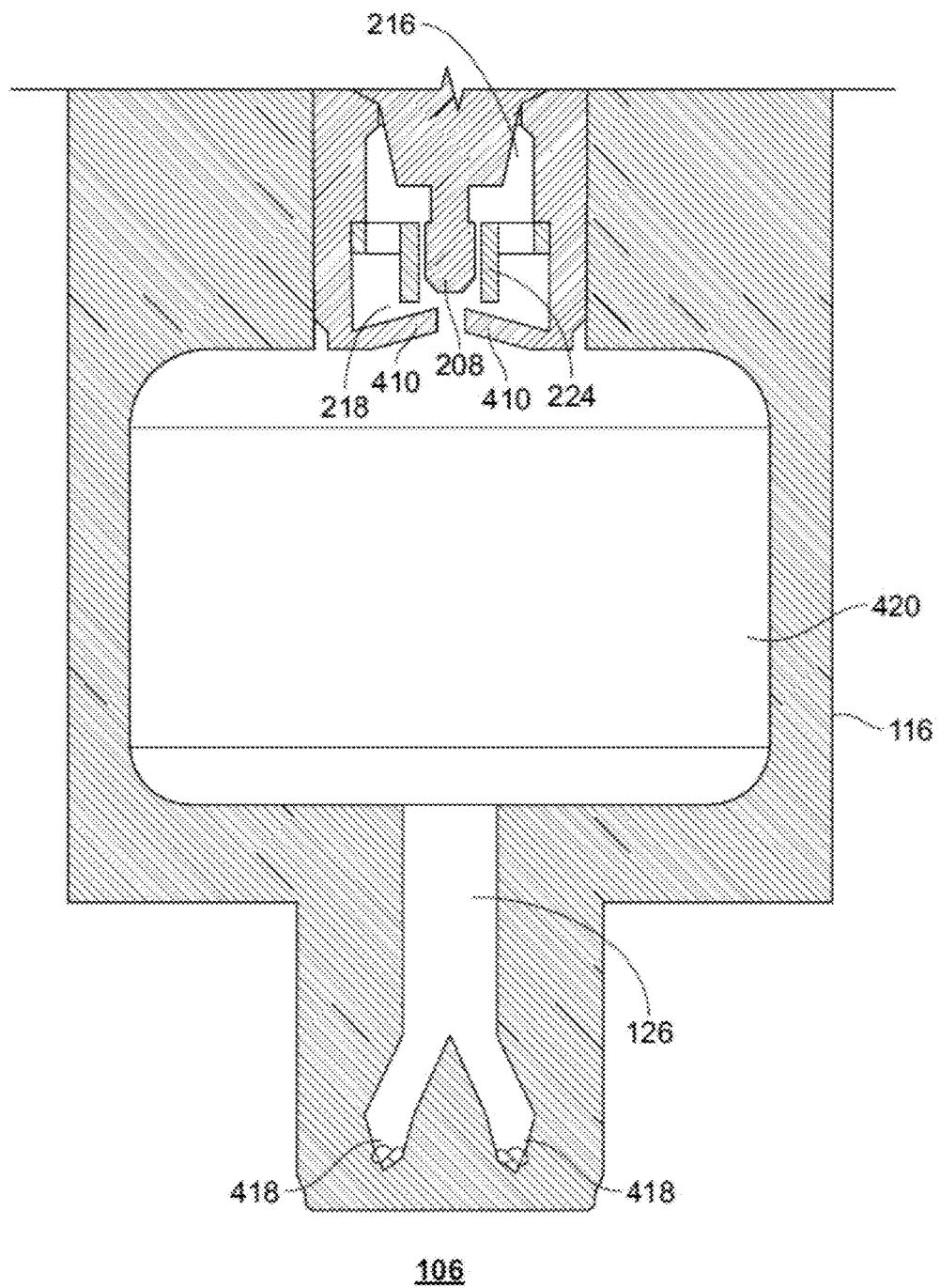
Figure 4G:
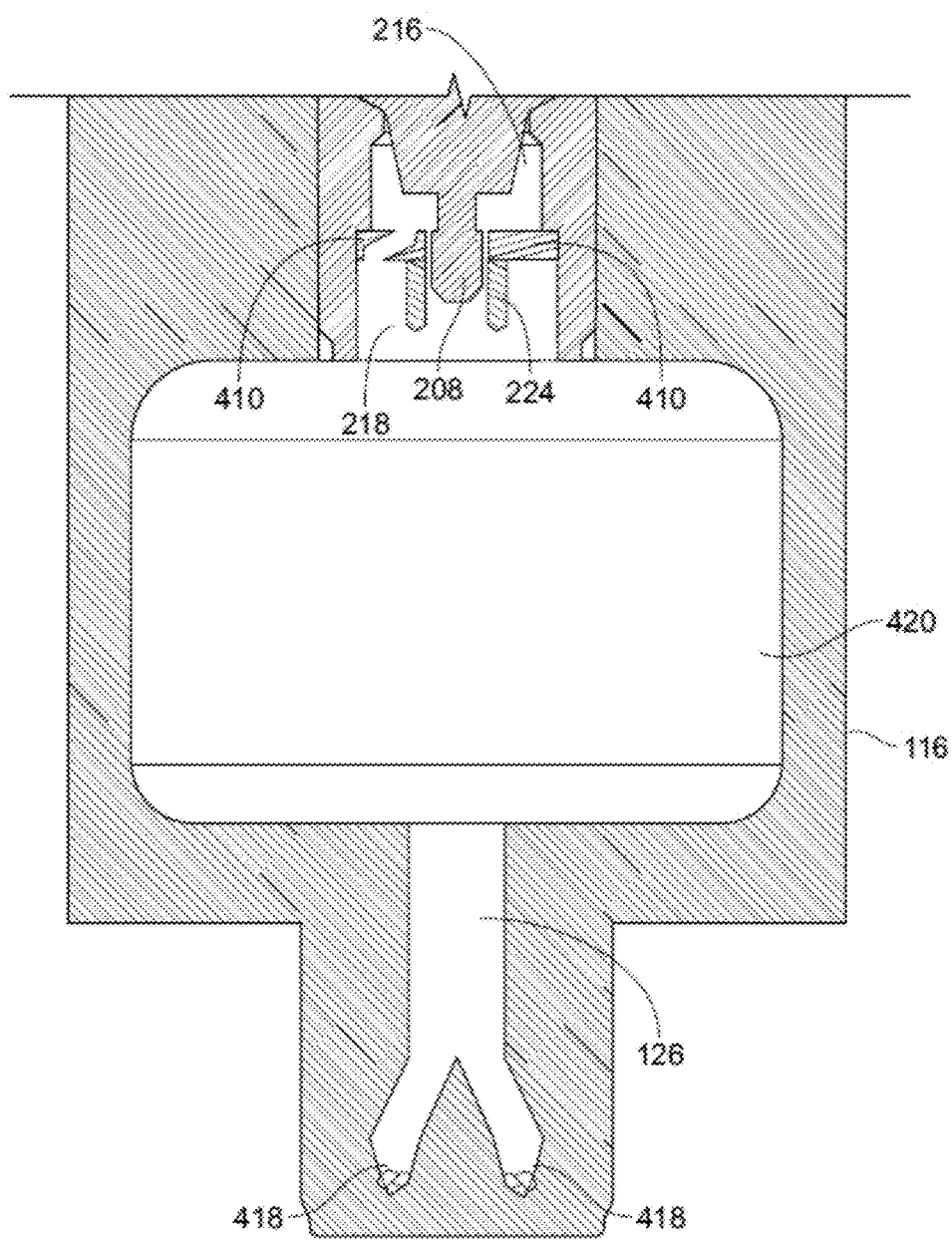
Figure 4H:
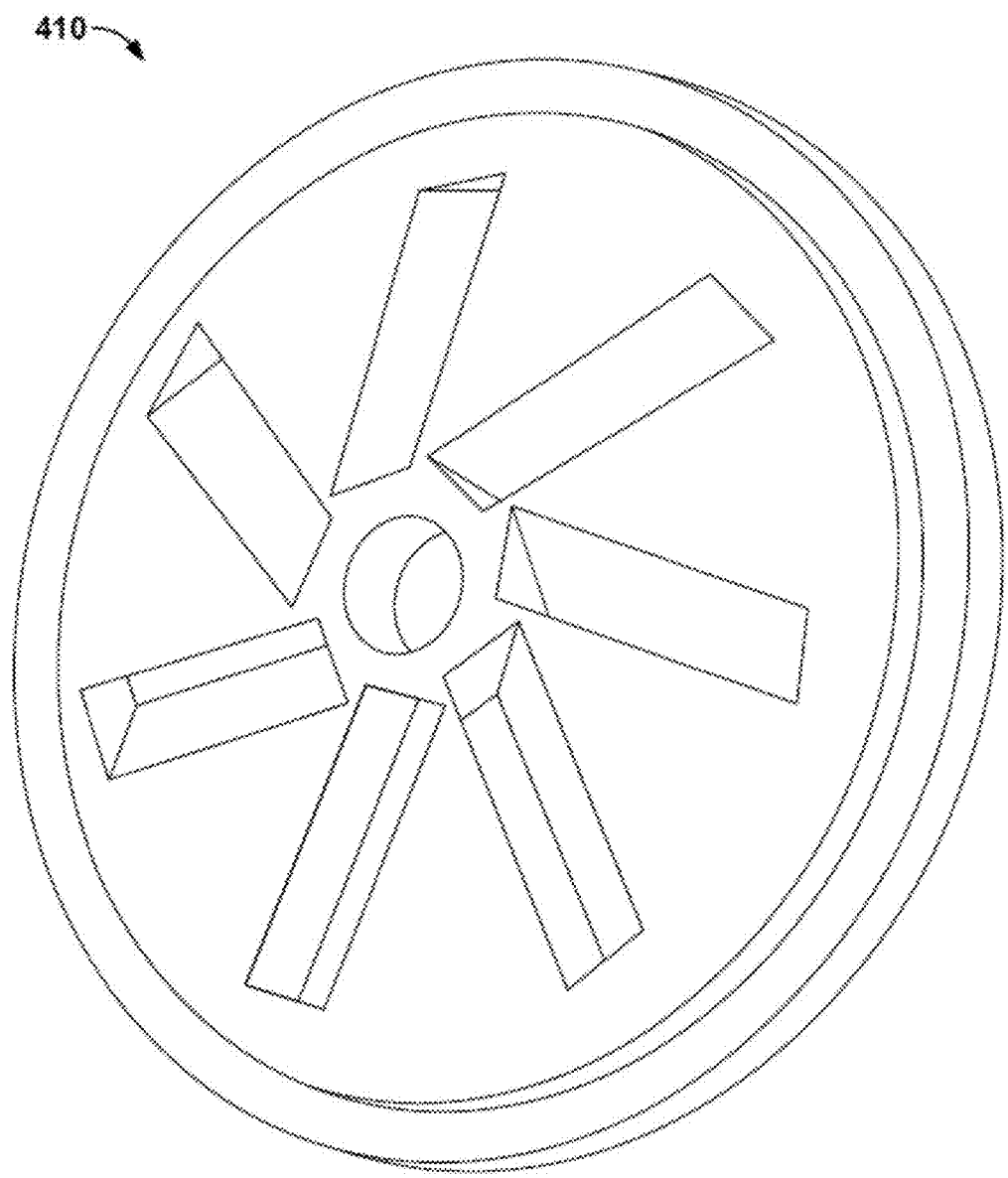
FIG. 4H is a perspective view of a slotted disc end cap.

FIG. 4F is an igniter plug with a slotted disc 410 as end cap. An example slotted disc 410 is shown in FIG. 4H. The disc 410 has a central opening which directs incoming cool, fresh air/fuel mixture into the tubular body 224. The disc 410 also has a plurality of slots or holes surrounding the central opening. The slots can be canted or angled to generate a swirl within the incoming fresh charge. After ignition, the slots and central opening are also jet passages that nozzle combusting air/fuel mixture from the prechamber into flame jets that reach deep into the antechamber 420 and ignite the charge in the antechamber 420. A portion of the incoming fresh charge is directed by the disc 410 laterally into the antechamber 420 to recirculate and generate the toroidal vortex. FIG. 4G is an igniter plug with an open end and a slotted disc 410 supporting the tubular body 224 and tubular ignition body 210.

Referring back to FIGS. 4A-4G, the example antechamber 420 is cylindrical rather than slightly tapered as in FIG. 3, yet achieves the same toroidal vortex of circulation flow. The side passages 418 are shaped to reduce loss of flow velocity of the flame from the antechamber to the combustion chamber and of the inflow of air/fuel mixture into the prechamber. The side passages 418 can also have an exit angle that is complementary to the angle at the top of the piston. In certain instances, the exit angle can direct the flow parallel to the face of the piston and/or toward the face of the piston at a shallow angle. The side passages 418 can meet with the central passage 126 at an angle that smoothly transitions incoming flow through the side passages 418 into the central passage 126, for example, to reduce velocity losses into the prechamber. The side passages 418 can be curved (FIGS. 4A-4E) or for manufacturing purposes formed of one or more straight sections (FIGS. 4F, 4G).

Figure 5:
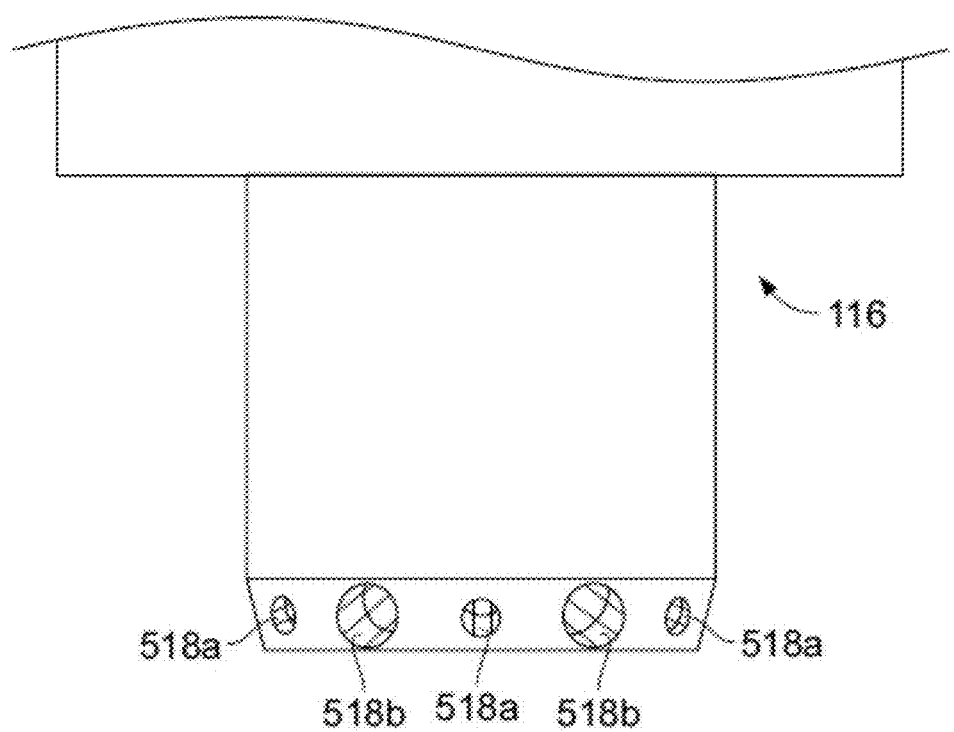
FIG. 5 is an exterior perspective view of a portion of an example tubular receiver housing showing multiple side passages.

FIG. 5 shows an exterior view of the housing, showing that side passages 418 can have one or more exterior profiles 518a, 518b of different size (i.e., flow area or diameter). For example, a first set of side passages can have a first minimum diameter and a second set of side passages can have a second minimum diameter that is larger than the first minimum diameter. In the present example, the exterior profiles 518a have a smaller flow area than the profiles 518b. Although only two sizes of profiles are shown, fewer or more profiles can be provided. The smaller profiles 518a jet the flames a shorter distance into the combustion chamber than the larger-diameter side passages 518b, in part because the jets from the smaller profiles 518a have less mass and momentum. The side passages 518a, 518b can also have different angles to direct the flame jets into different regions of the combustion chamber 106. Flame jets with multiple distances or multiple angles can better fill the combustion chamber with flame jets to enable more complete combustion of the fuel/air mixture in combustion chamber 106. Furthermore, the flame jets can be configured to jet into the combustion chamber but not impinge significantly on the sidewalls of the combustion chamber or on the piston. Flame jets impinging on the sidewalls or piston can lose heat to the surfaces and thus reduce combustion efficiency.

An antechamber and igniter assembly as described herein can enable a leaner mixture to be used in the combustion chamber and inside the igniter plug. In some implementations, it can enable consistent combustion of very lean air/fuel mixtures without a supply auxiliary fuel to the igniter plug. In some implementations, the assembly enables λ in the combustion chamber and the λ in the igniter plug equal to or greater than 1.6 (i.e., 1.7, 1.8, 1.9 or greater) to be consistently ignited without an auxiliary fuel feed into the igniter plug, where λ is defined as the ratio of the actual air-to-fuel ratio to the stoichiometric ratio (i.e., stoichiometric ratio is λ=1). The antechamber and prechamber assembly also enables faster combustion. In some implementations, the combustion can occur in less than 20 degrees of crank angle in engines with a bore greater than 160 mm.

Figure 6:
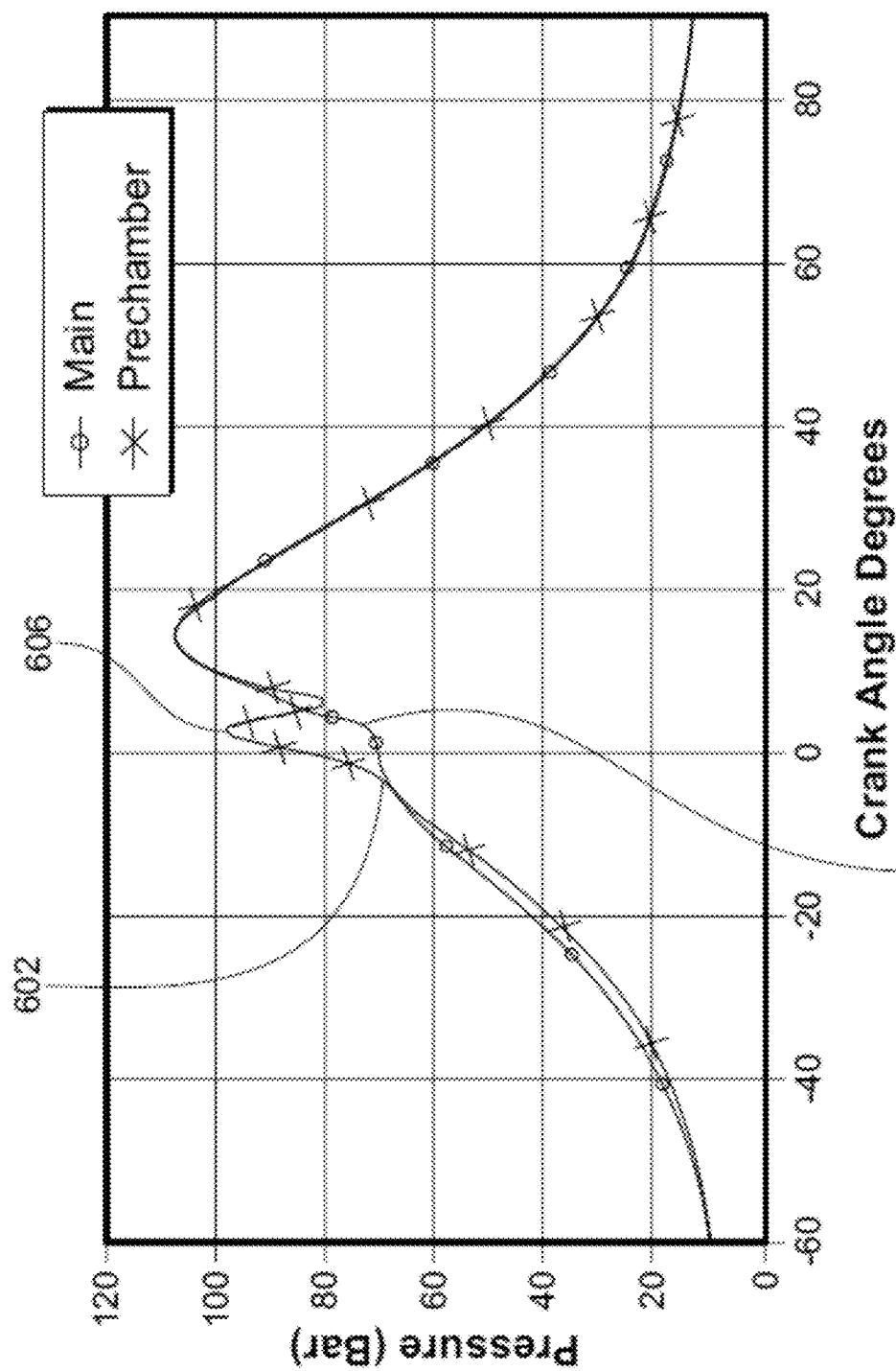
FIG. 6 is a graph of mean pressure in the main combustion chamber and in the igniter plug over crank angle for an example M18 sized igniter plug.

The ability of the igniter plug to consistently ignite very lean air/fuel mixtures without auxiliary fuel into the igniter plug is evidenced by the pressure rise upon ignition exhibited by the plug. FIG. 6 shows a graph of mean pressure in the main combustion chamber and in the igniter plug over crank angle for an example M18 sized igniter plug in an engine operating at 1500 rpm, with an effective compression ratio of 12 and indicated mean effective pressure (IMEP) or approximately 18 bar. The flow area into the pre-chamber enclosure of the igniter plug (i.e., via the openings, such as openings 202, 222) is 60 mm². Neither the pre-chamber enclosure nor the antechamber have an auxiliary fuel supply, and thus are only igniting the air/fuel mixture received from the combustion chamber.

The pressure rise in the pre-chamber enclosure tracks and slightly trails the pressure rise in the combustion chamber prior to ignition. At ignition in the pre-chamber enclosure, at point 602 a few degrees before top dead center (TDC, i.e. 0 degrees), ignition has not yet begun in the combustion chamber. From ignition in the pre-chamber enclosure, point 602, the pressure in the pre-chamber enclosure rises over the pressure in the combustion chamber to a maximum mean pressure, at point 606, that is approximately 20 bar higher than the maximum mean pressure in the combustion chamber prior to ignition in the combustion chamber. This pressure rise is indicative of strong and healthy ignition and combustion within the pre-chamber enclosure. At point 604, ignition in the combustion chamber begins as flames are jetted from the antechamber into the combustion chamber, and the pressure rises to reach the maximum post ignition pressure in the combustion chamber. The flow area into the pre-chamber enclosure (noted above as being 60 mm²) affects the pressure rise in the chamber, as well as the rate air/fuel mixture is exchanged in and out of the igniter plug. One measure of the strength of the ignition in the pre-chamber is the product of this flow area times the pressure rise in the pre-chamber. In certain instances, the igniter plug, without an auxiliary supply of fuel, can achieve a maximum mean pressure in the pre-chamber enclosure after ignition in the pre-chamber enclosure and before ignition in the combustion chamber time the flow area into the pre-chamber enclosure to be 1200 bar-sqmm or greater.

Figure 7:
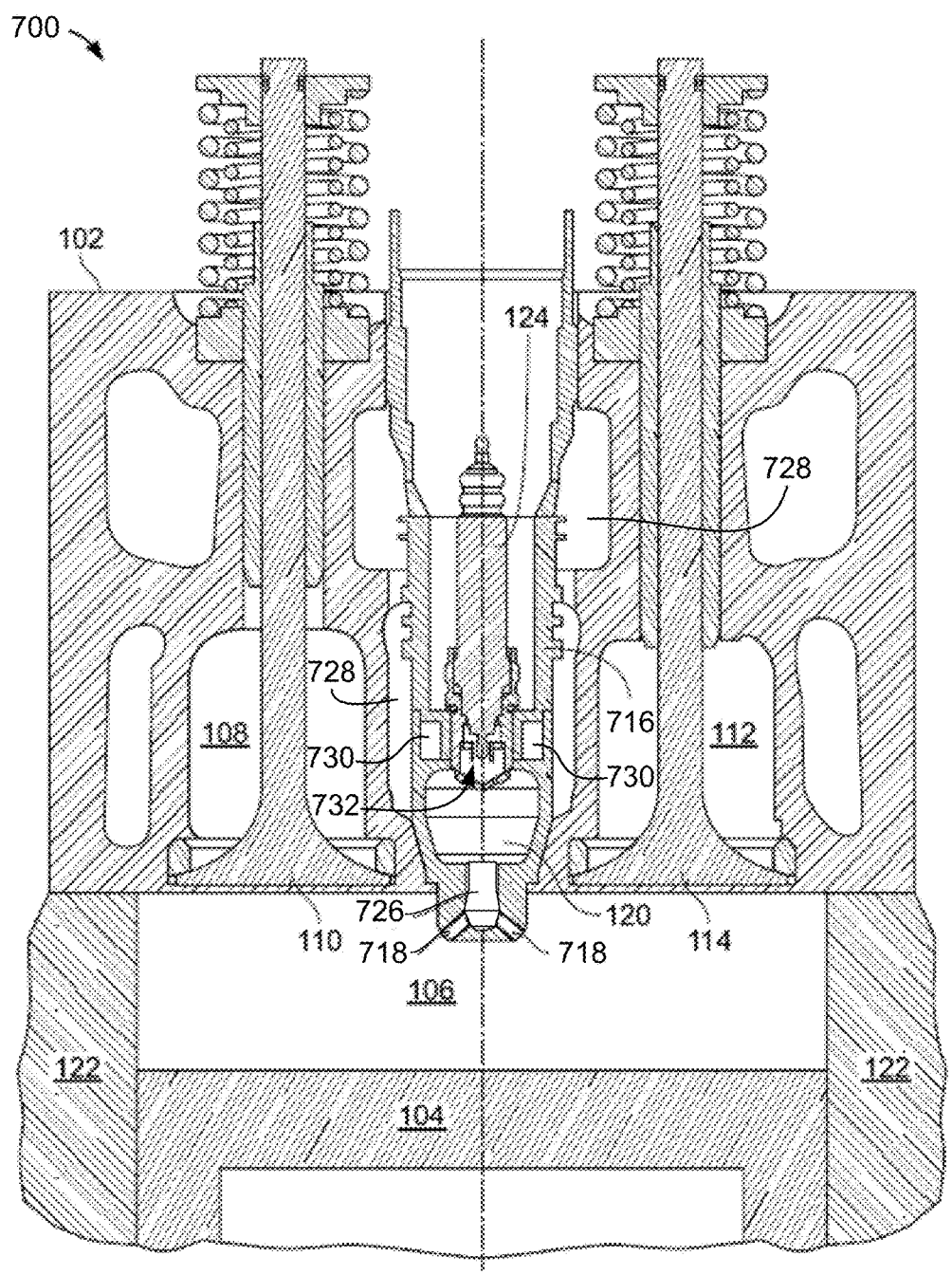
FIG. 7 is a side cross-sectional view of a portion of an internal combustion engine including another example prechamber ignition plug in an antechamber, here shown in a tubular receiver housing defining an engine coolant passage.

FIG. 7 shows a cross-section of a portion of another example internal combustion engine 700. Internal combustion engine 700 is substantially similar to internal combustion engine 100 shown in FIG. 1. The example engine 700 includes an example tubular receiver enclosure or housing 716, which like above, defines an enclosure that receives and couples to the igniter plug 124 and couples to the internal combustion engine 700. The example engine 700 includes a coolant jacket 728 formed in the head 102 that communicates circulating engine coolant through the head 102 and adjacent components carried by the head. The tubular receiver housing 716 is received in a portion of the coolant jacket 728, such that coolant flows over the exterior of the tubular receiver housing 716.

The tubular receiver housing 716 defines one or more engine coolant passages 730 within the housing. Here, one engine coolant passage 730 is shown as an annular passage, extending circumferentially around the tubular receiver housing 716 and concentrated, axially, in the region of the tubular receiver housing 716 adjacent the igniter 732 of the igniter plug 124. The passage 730, as shown, does not extend down around the sides of the receiver housing 716 defining the antechamber 120. The passage 730 is coupled to the coolant jacket 728, so that engine coolant flowing through the head 102 is also communicated from the coolant jacket 728 to the passage 730. The housing 716 includes one or more apertures 702 in its sidewall to allow communication of coolant from the coolant jacket 728 into the passage 730. The coolant passage 730 is sealed from the igniter plug 124 and from the interior of the antechamber 120, so that engine coolant is not introduced into or contacted to these components. Flowing coolant into and through the coolant passage 730 cools the region of the tubular receiver housing 716 in the vicinity of the igniter 732. For example, coolant in the engine coolant passage 730 can cool gasses (air/fuel mixture or combustion byproducts) within the prechamber 736 or cool components of the igniter 732 (e.g., cool the ignition bodies of the igniter 732). The portion of the receiver housing 716 defining the majority of the antechamber 120 is not in contact with the engine coolant in the coolant passage 730, or the contact is small, so that the heat transfer between the gasses in the antechamber 120 and the engine coolant in the coolant passage 730 is small. In other words, the passage 730 is arranged so that the majority of the heat transfer between the receiver housing 716/igniter plug 124 and the engine coolant in the passage 730 occurs in the region proximate to the igniter 732. Such an arrangement enables cooling the igniter 732 and surrounding gasses within the igniter plug 124 with substantially reduced or no substantial cooling of the antechamber 120 and gasses in the antechamber. As discussed in more detail below, the cooling achieved by the coolant passage 730 can reduce pre-ignition in the igniter plug 124.

Figure 8:
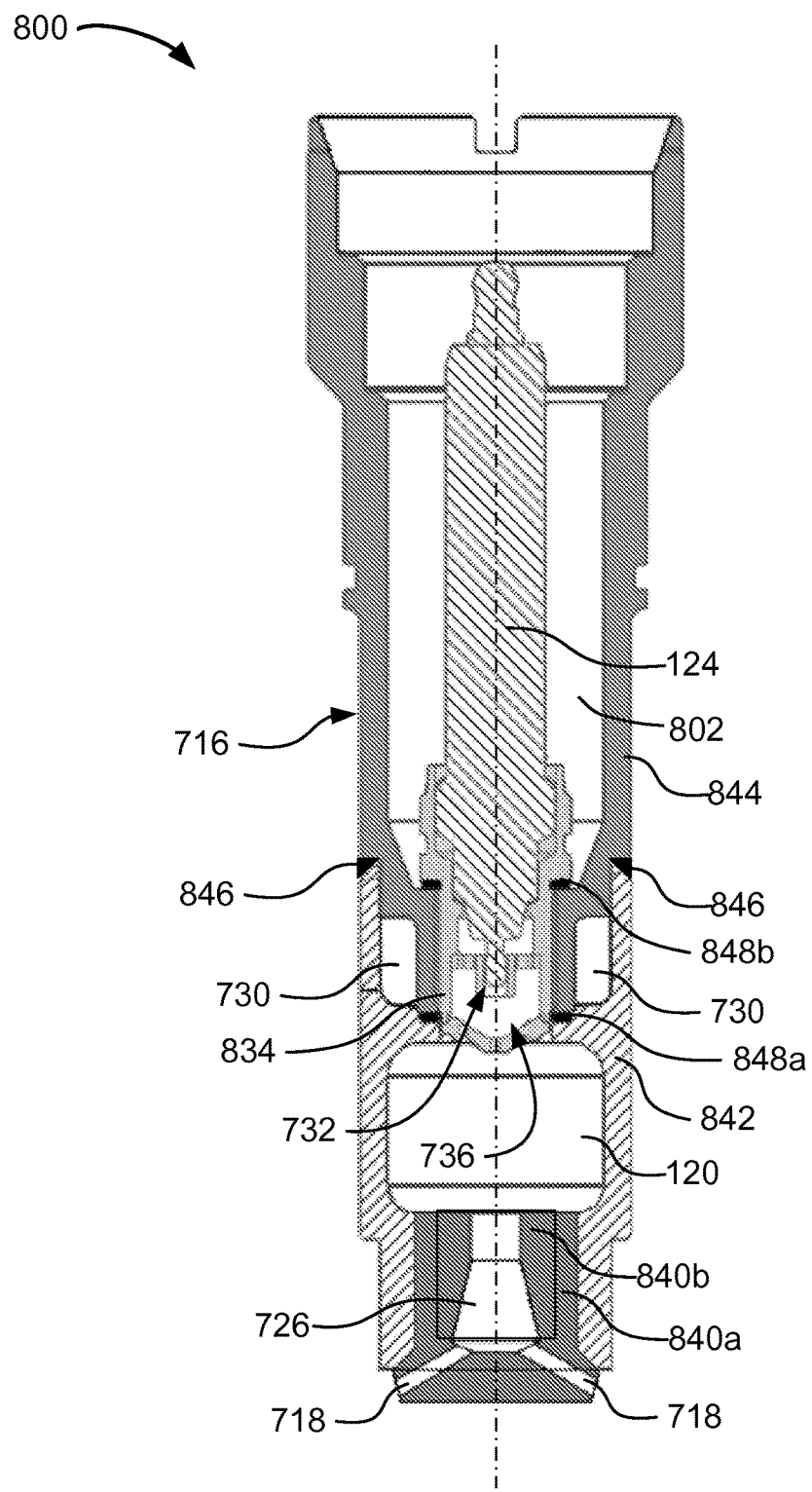
FIG. 8 is half side cross-sectional view of a portion of an example prechamber ignition plug and tubular receiver housing defining an engine coolant passage.

FIG. 8 shows a cross-section of the example igniter plug assembly 800 of engine 700, including tubular receiver housing 716 and igniter plug 124 (e.g., igniter plug 200 described above with respect to FIG. 2). Although described here with respect to igniter plug 200, the concepts are equally applicable to other types of igniter plugs, including the others described herein, as well as igniter plugs without a shell (e.g., shell 214). The tubular receiver housing 716 in this example is formed in multiple parts, including a first part 842 coupled to a second part 844. The first part 842 defines the antechamber 120 and the passages that communicate the antechamber 102 with the combustion chamber, i.e., the central passage 726 and the side passages 718. The second part 844 defines a plug receptacle 802 that receives the igniter plug 124 and has female threads that engage and mate with male threads on the exterior of the shell 834 to secure the igniter plug 124 in the receiver housing 716. Also, a portion of the exterior of the second part 844 can be threaded to allow the tubular receiver housing 716 to threadingly engage the head 102. The end of the second part 844 opposite the central passage 726 is open to the antechamber 120. The first part 842 is affixed to the second part 844 at the end of the first part 842 opposite the combustion chamber. In some instances, the parts 842, 844 are affixed at a juncture 846, for example, by welding, brazing, soldering, mating threads or another technique. Seals 848 are provided to seal the igniter plug 200 to the receiver housing 700 and the parts 842, 844 of the receiver housing 700 together. For example, an annular seal 848a is shown clamped between opposing surfaces of the parts 842, 844 near the bottom of the coolant passage 730, and another annular seal 848b is shown clamped between opposing surfaces of the second part 844 and the igniter plug 124.

The engine coolant passage 730 is defined between the outside of the second part 844 and the inside of the first part 842, extending circumferentially around the plug receptacle 802 and axially coinciding with the plug receptacle 802 and the sidewall of the igniter plug shell 214, prechamber 736 and igniter 732. The engine coolant passage 730 has one or more engine coolant apertures 702 to communicate engine coolant with an engine coolant passage of the internal combustion engine when the tubular receiver housing is coupled to the internal combustion engine. As such, engine coolant in the engine coolant passage 730 allows cooling of the shell 214 and the sidewalls of the prechamber 736, as well as gasses in the prechamber 736 and the components of igniter 732. The engine coolant passage 730 is positioned so that engine coolant in the passage 730 is in a conductive heat transfer path from the igniter plug 200 to the coolant passage 730. The heat transfer path from the igniter plug 200 to the passage 730 is a straight, transverse path through the sidewall of the shell 214 (if present) and through the sidewall of the second part 844. The engine coolant passage 730 also allows cooling gasses within the prechamber 736 such as air/fuel mixture or residual combusted gas. In some instances, the sidewalls of the engine coolant passage 730 can have fins or other features to increase surface area and facilitate heat transfer.

The cooling from the coolant passage 730 can extract and help reduce residual heat from multiple combustion events stored within the igniter 732 components, in the shell 214, in the sidewalls of the prechamber 736, and residuals within the prechamber 736. The stored heat tends to heat the air/fuel mixture within the prechamber 736, causing pre-ignition. Thus, cooling the prechamber 736 with engine coolant via the engine coolant passage 730 can reduce residual heat and the likelihood of pre-ignition.

In some implementations, the second part 844 of the tubular receiver housing 716 is made of a material with higher thermal conductivity than the first part 842, and particularly at least the portion of the second part between the igniter plug 200 and coolant passage 730, to help conduct heat from the igniter plug 200 to the engine coolant in the coolant passage 730. For example, the first part 842 could be made of stainless steel or iconel, and the second part 844 could be made of a low-carbon or alloy steel. Other materials could be used.

While residual heat in the prechamber 736 can decrease engine efficiency, residual heat in the antechamber 120 can improve engine efficiency. Residual heat in the antechamber 120 can facilitate faster and more complete combustion of air/fuel mixture within the antechamber 120, which can produce larger jets of flame out of the side passages 718 into the combustion chamber of the engine. The stronger jets of flame cause faster and more complete combustion of the air/fuel mixture within the combustion chamber, and thus improve engine efficiency. With the first part 842 made of a relatively low thermal conductivity material, particularly the portion adjacent the coolant passage 730, it insulates the gasses in the antechamber 120 from heat exchange to the engine coolant in the coolant passage 730. Thus, less heat is dissipated away from the antechamber 120 and its contents, and more residual heat remains in the antechamber 120. In some instances, in lieu of or in addition to making the first portion 844 from a material of lower thermal conductivity than the second part 844, the first portion 844 can be coated with a thermal coating that tends to block heat transfer with the engine coolant in the coolant passage 730 and/or the surroundings. The coating can be applied on an interior portion or an exterior portion of sidewall and/or end walls of the first part 842. For example, the thermal barrier coating can include a ceramic coating and/or another type of coating.

To reduce heat transfer from the igniter plug 200 into the first part 842 of the receiver housing 700 and antechamber 120, in the example of FIG. 8, the first part 842 contacts the second part 844 of the receiver housing 700 only in locations apart from where the second part 844 contacts the hottest parts (during operation) of the igniter plug 200. For example, the second part 844 joins the first part 842 axially adjacent opposing axial ends of the igniter plug shell 214 and opposing axial ends of the coolant passage 730, but does not contact the first part 842 in other locations or contact the igniter plug 200. In other words, the joint 846 between the first part 842 and the second part 844 is axially behind (opposite the igniter 732) the base of the shell 214. The first and second parts 842, 844 contact again forward of the opposing axial end of the shell 214 (i.e., the end having the central and side passages 725, 718). Additionally, the seals 848 between the first part 842 and the second part 844 can help reduce heat transfer.

In some implementations, to facilitate manufacture, the first part 842 includes a multi-part end cap 840 that defines the central passage 726 and the diverging side passages 718. The end cap 840 of FIG. 8 has a lower sub-part 840a that has the side passages 718 and a portion of the central passage 726, and an upper sub-part 840b that has the remainder of the central passage 726. The two part construction enables the central passage 726 to be initially bored or drilled in a straight segment to facilitate manufacture with straight bits or mills. Then, the conical portion of the central passage 726 can be machined into the upper sub-part 840b from the larger diameter to the smaller diameter of the conical shape. The opposing conical portion of the central passage 726 can be machined into lower sup-part 840a also from the larger diameter to the smaller diameter of the conical shape. Then, the upper sub-part 840b can be received into and affixed into a receptacle of the lower sub-part 840a (e.g., welded or otherwise) to form the end cap 840 with an enclosed converging-diverging shape in the central passage 726. Finally, the end cap 840 is affixed to the first part 842 of the receiver housing 700. Of note, to further facilitate manufacture, the diverging side passages 718 can be straight to facilitate manufacture with straight drill bits or mills. As above, the side passages 718 can be uniform diameter or have two or more different diameters.

Figure 9:
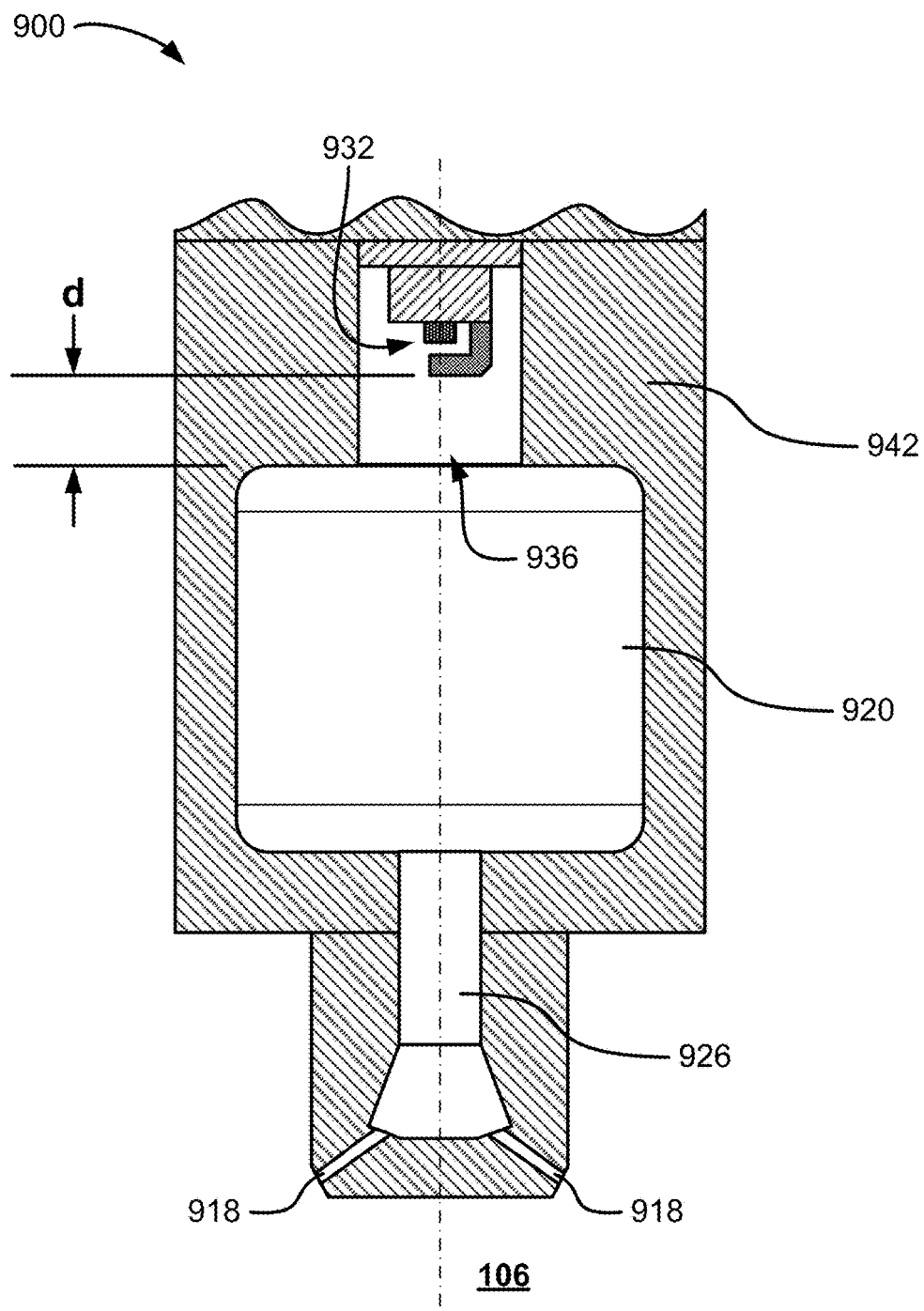
FIG. 9 is detail half side cross-sectional view of a portion of an example tubular receiver housing with an antechamber and jet passages.

FIG. 9 shows an example utilizing an igniter plug 924 without a shell. As above, the igniter plug assembly 900 includes a tubular receiver housing 942 that receives and couples to an igniter plug 924. The tubular receiver housing 942 is similar to tubular receiver housing 716, except as noted below. In particular, the receiver housing 942 is arranged to receive the igniter plug 924 so that its igniter 932 is recessed a distance d from an end of the antechamber 120. The recess effectively defines a prechamber 936 around the igniter 932, acting as a stagnation zone for air/fuel mixture jetted into the prechamber 936 from the central passage 926. The stagnation zone increases air/fuel mixture pressure in the region surrounding the igniter 932 and allows for more efficient flame kernel generation. The recess distance d of the igniter 932 to generate the stagnation zone can be determined experimentally or by a simulation such as a computational fluid dynamics (CFD) analysis.

The igniter 932 shown in FIG. 9 is that of a J-gap type plug, having a J-shaped electrode and center electrode, but other types of igniter plugs or other arrangements of ignition bodies are within the concepts herein. For example, in certain instances, the igniter 932 has multiple electrodes (J-shaped or otherwise) or a tubular electrode similar to igniter plug 200 shown in FIG. 2.

A number of examples have been described. Nevertheless, it will be understood that various modifications may be made. Accordingly, other examples are within the scope of the following claims.

We claim:

1. A system for igniting a mixture in an internal combustion engine, the system comprising:
   an ignition plug comprising an igniter; and
   an enclosure comprising a plug receptacle that receives the ignition plug and an engine coolant passage around the plug receptacle, the enclosure defining an outer chamber about an end of the ignition plug that is larger in volume than a fluid containing interior chamber enclosing the igniter, the outer chamber comprising a jet passage between an interior and an exterior of the enclosure, the outer chamber curved to direct flow incoming through the jet passage to circulate in the outer chamber and recombine with the incoming flow,
   wherein the enclosure comprises a first part comprising the jet passage and the outer chamber and a second part coupled to the first part defining the plug receptacle, and
   wherein the second part contacts the first part only at opposing ends of the engine coolant passage.

2. The system of claim 1, wherein an end of the plug receptacle is open to the outer chamber, and wherein the engine coolant passage is outside of the plug receptacle and adjacent a sidewall of the interior chamber.

3. The system of claim 1, wherein enclosure comprises an end cap defining the jet passage, and
   wherein the jet passage comprises a central passage and a plurality of diverging side passages between the outer chamber and a combustion chamber of the engine.

4. The system of claim 3, wherein the side passages are straight.

5. A system for igniting a mixture in an internal combustion engine, the system comprising:
   an ignition plug comprising an igniter; and
   an enclosure comprising a plug receptacle that receives the ignition plug and an engine coolant passage around the plug receptacle, the enclosure defining an outer chamber about an end of the ignition plug that is larger in volume than a fluid containing interior chamber enclosing the igniter, the outer chamber comprising a jet passage between an interior and an exterior of the enclosure, the outer chamber curved to direct flow incoming through the jet passage to circulate in the outer chamber and recombine with the incoming flow,
   wherein enclosure comprises an end cap defining the jet passage,
   wherein the jet passage comprises a central passage and a plurality of diverging side passages between the outer chamber and a combustion chamber of the engine, and
   wherein the plurality of side passages comprises a first set of side passages having a first minimum diameter and a second set of side passages having a second minimum diameter that is larger than the first minimum diameter.

6. The system of claim 3, wherein the end cap comprises a first sub-part defining the central passage and a second sub-part defining the side passages, and where the central passage is straight.

7. A system for igniting a mixture in an internal combustion engine, the system comprising:
   an ignition plug comprising an igniter; and
   an enclosure comprising a plug receptacle that receives the ignition plug and an engine coolant passage around the plug receptacle, the enclosure defining an outer chamber about an end of the ignition plug that is larger in volume than a fluid containing interior chamber enclosing the igniter, the outer chamber comprising a jet passage between an interior and an exterior of the enclosure, the outer chamber curved to direct flow incoming through the jet passage to circulate in the outer chamber and recombine with the incoming flow, wherein the enclosure comprises a first part comprising the jet passage and the outer chamber and a second part coupled to the first part defining the plug receptacle, and wherein the first part is made substantially of a first material and the second part is made substantially of a second material, the first material having a lower thermal conductivity than the second material.

8. The system of claim 1, wherein a sidewall surface of the outer chamber is thermal barrier coated.

9. The system of claim 1, wherein the enclosure defines an engine coolant inlet adapted to communicate engine coolant with an engine coolant passage of the internal combustion engine when the enclosure is coupled to the internal combustion engine.

10. The system of claim 1, wherein outer chamber is curved to recombine circulating flow in the outer chamber with the incoming flow from the jet passage, adjacent to the jet passage and orthogonally to or in the general direction of the incoming flow.

11. A method of igniting an air/fuel mixture in an internal combustion engine, the method comprising:
receiving the air/fuel mixture as an incoming air/fuel mixture flow from a combustion chamber of the internal combustion engine into an enclosure adjacent the combustion chamber;
directing a portion of the air/fuel mixture received in the enclosure toward an ignition gap between first and second ignition bodies and another portion of the air/fuel mixture to circulate in the enclosure and recombine with the incoming air/fuel mixture;
igniting the air/fuel mixture in the ignition gap;
communicating engine coolant through an engine coolant passage in the enclosure, cooling the first and second ignition bodies; and
jetting flames from the enclosure into the combustion chamber through a first set of side passages having a first minimum diameter and through a second set of side passages having a second minimum diameter that is larger than the first diameter.

12. The method of claim 11, comprising jetting flames through the second set of side passages to travel further into the combustion chamber than flames jetted through the first set of side passages.

13. The method of claim 11, where the enclosure is an outer enclosure and directing the air/fuel mixture received into the outer enclosure toward the first and second ignition bodies comprises directing the air/fuel mixture received into the outer enclosure to impinge on an inner enclosure within the outer enclosure; and
comprising receiving the air/fuel mixture impinging on the inner enclosure into the inner enclosure and directing the air/fuel mixture received into the inner enclosure into the ignition gap.

14. The method of claim 11, comprising communicating engine coolant with the engine coolant passage of the internal combustion engine when a tubular receiver housing is coupled to the internal combustion engine, the tubular receiver housing comprising the enclosure and adapted to couple to the internal combustion engine.

15. An internal combustion engine, comprising:
an ignition plug comprising an igniter;
an enclosure receiving the ignition plug, the enclosure comprising:
a first part comprising a jet passage and defining a chamber, the chamber adapted to direct flow incoming through the jet passage to circulate in the chamber and recombine with the incoming flow; and
a second part coupled to the first part defining a plug receptacle that receives the ignition plug and defining an engine coolant passage apart from the chamber,
wherein the first part is made substantially of a first material and the second part is made substantially of a second material, the first material having a lower thermal conductivity than the second material.

16. The system of claim 1, wherein the engine coolant passage is annular and extends circumferentially around the plug receptacle, axially coinciding with the igniter.

17. The system of claim 1, wherein the enclosure comprises a first part comprising the jet passage and the outer chamber and a second part coupled to the first part defining the plug receptacle.

18. The method of claim 11, comprising recombining the incoming air/fuel mixture flow with the air/fuel mixture flow orthogonally to or generally in the direction of the incoming air/fuel mixture flow.

19. The system of claim 1, wherein the outer chamber is shaped symmetrically about a centerline of the plug receptacle, the outer chamber curved to direct flow incoming through the jet passage to circulate symmetrically in the outer chamber and recombine with the incoming flow.

20. The system of claim 1, wherein the jet passage is positioned symmetrically about a centerline of the outer chamber, the outer chamber curved to direct flow incoming through the jet passage to circulate symmetrically in the outer chamber and recombine with the incoming flow.

* * * * *